United States Patent
Wieder

(10) Patent No.: US 11,165,999 B1
(45) Date of Patent: Nov. 2, 2021

(54) IDENTIFYING AND PROVIDING COMPOSITIONS AND DIGITAL-WORKS

(71) Applicant: James W. Wieder, Ellicott City, MD (US)

(72) Inventor: James W. Wieder, Ellicott City, MD (US)

(73) Assignee: SYNERGYZE TECHNOLOGIES LLC, Ellicott, MD (US)

( * ) Notice: Subject to any disclaimer, the term of this patent is extended or adjusted under 35 U.S.C. 154(b) by 323 days.

(21) Appl. No.: 16/254,818

(22) Filed: Jan. 23, 2019

Related U.S. Application Data

(63) Continuation of application No. 13/804,918, filed on Mar. 14, 2013, now abandoned, which is a
(Continued)

(51) Int. Cl.
*H04N 9/79* (2006.01)
*G06Q 20/12* (2012.01)
(Continued)

(52) U.S. Cl.
CPC .............. *H04N 9/79* (2013.01); *G06F 16/70* (2019.01); *G06F 16/783* (2019.01);
(Continued)

(58) Field of Classification Search
CPC ......... H04N 9/79; G06F 16/70; G06F 16/783; G06K 9/00744; G06Q 20/1235; G06Q 20/22; G06Q 20/3821; G06Q 20/3825
(Continued)

(56) References Cited

U.S. PATENT DOCUMENTS

| 4,788,675 A | 11/1988 | Jones et al. |
| 5,204,897 A | 4/1993 | Wyman |

(Continued)

FOREIGN PATENT DOCUMENTS

| EP | 0751471 | 2/1997 |
| EP | 03104970.3 | 7/2005 |

(Continued)

OTHER PUBLICATIONS

Apple's plan to offer music hits right note. Lincoln Journal Star, May 21, 2003; p. 7, cited in U.S. Appl. No. 12/889,371.
(Continued)

*Primary Examiner* — James D Nigh
(74) *Attorney, Agent, or Firm* — James W. Wieder

(57) ABSTRACT

A method for identifying and providing a composition or digital-work to a user. The user may explicitly and/or implicitly indicate an interest in a composition that is discovered during everyday activities. The "interesting" composition and/or information associated with the composition may be emanating from an external source (e.g., background music in a restaurant) or may be encountered while using an interactive device (e.g., surfing the web); or information (e.g., a magazine article or advertisement) about/associated with a composition may be encountered by the user. A portion of the "interesting" composition and/or information about/associated with the "interesting" composition may be captured and the composition identified. A composition or composition-highlight related to the identified-composition may be provided one or more times; within a customized sequence of compositions that is generated and/or adapted for each user. The provided-composition may be added to the user's favorites or library. Usage-rights for the provided-composition may be acquired for the user. The composition may be any type of digital-work including
(Continued)

music, sound, text, image, video or other media. In some cases, the composition may be an advertisement for a product or service.

20 Claims, 18 Drawing Sheets

Related U.S. Application Data continuation-in-part of application No. 11/164,194, filed on Nov. 14, 2005, now Pat. No. 8,554,681, which is a continuation-in-part of application No. 11/161,710, filed on Aug. 12, 2005, now Pat. No. 8,001,612, which is a continuation-in-part of application No. 10/605,879, filed on Nov. 3, 2003, now Pat. No. 7,884,274.

(51) Int. Cl.
*G06Q 20/22* (2012.01)
*G06Q 20/38* (2012.01)
*G06F 16/783* (2019.01)
*G06K 9/00* (2006.01)
*G06F 16/70* (2019.01)

(52) U.S. Cl.
CPC ..... *G06K 9/00744* (2013.01); *G06Q 20/1235* (2013.01); *G06Q 20/22* (2013.01); *G06Q 20/3821* (2013.01); *G06Q 20/3825* (2013.01)

(58) Field of Classification Search
USPC ......................................................... 705/51
See application file for complete search history.

(56) References Cited

U.S. PATENT DOCUMENTS

| | | |
|---|---|---|
| 5,592,511 A | 1/1997 | Schoen et al. |
| 5,616,876 A | 4/1997 | Cluts |
| 5,664,046 A | 9/1997 | Abecassis |
| 5,719,786 A | 2/1998 | Nelson et al. |
| 5,732,216 A | 3/1998 | Logan et al. |
| 5,734,719 A | 3/1998 | Tsevdos et al. |
| 5,801,747 A | 9/1998 | Bedard |
| 5,848,396 A | 12/1998 | Gerace |
| 5,894,119 A | 4/1999 | Tognazzini |
| 5,913,204 A | 6/1999 | Kelly |
| 5,918,213 A | 6/1999 | Bernard et al. |
| 5,926,624 A | 7/1999 | Katz et al. |
| 5,945,988 A | 8/1999 | Williams et al. |
| 5,963,916 A | 10/1999 | Kaplan |
| 5,973,250 A | 10/1999 | Zirille et al. |
| 5,973,612 A | 10/1999 | Deo et al. |
| 5,977,964 A | 11/1999 | Williams et al. |
| 6,005,597 A | 12/1999 | Barrett et al. |
| 6,020,883 A | 2/2000 | Herz et al. |
| 6,112,181 A | 8/2000 | Shear et al. |
| 6,226,618 B1 | 5/2001 | Downs |
| 6,232,539 B1 | 5/2001 | Looney et al. |
| 6,246,672 B1 | 6/2001 | Lumelsky |
| 6,247,130 B1 | 6/2001 | Fritsch |
| 6,248,946 B1 | 6/2001 | Dwek |
| 6,253,237 B1 | 6/2001 | Story et al. |
| 6,295,555 B1 | 9/2001 | Goldman |
| 6,317,722 B1 | 11/2001 | Jacobi et al. |
| 6,349,329 B1 | 2/2002 | Mackintosh et al. |
| 6,385,596 B1 | 5/2002 | Wiser et al. |
| 6,389,467 B1 | 5/2002 | Eyal |
| 6,410,837 B2 | 6/2002 | Tsutsumi |
| 6,423,892 B1 | 7/2002 | Ramaswamy |
| 6,430,573 B1 | 8/2002 | Pachet et al. |
| 6,438,752 B1 | 8/2002 | McClard |
| 6,452,083 B2 | 9/2002 | Pachet et al. |
| 6,460,036 B1 | 10/2002 | Herz |
| 6,484,199 B2 | 11/2002 | Eyal |
| 6,496,802 B1 | 12/2002 | van Zoest et al. |
| 6,502,194 B1 | 12/2002 | Berman et al. |
| 6,505,160 B1 | 1/2003 | Levy |
| 6,507,764 B1 | 1/2003 | Parrella et al. |
| 6,519,648 B1 | 2/2003 | Eyal |
| 6,529,584 B1 | 3/2003 | Ravago et al. |
| 6,539,395 B1 | 3/2003 | Gjerdingen et al. |
| 6,552,254 B2 | 4/2003 | Hasegawa et al. |
| 6,555,738 B2 | 4/2003 | Hughes et al. |
| 6,570,080 B1 | 5/2003 | Hasegawa et al. |
| 6,594,699 B1 | 7/2003 | Sahai et al. |
| 6,609,096 B1 | 8/2003 | De Bonet et al. |
| 6,609,105 B2 | 8/2003 | Van Zoest et al. |
| 6,647,417 B1 | 11/2003 | Hunter et al. |
| 6,662,231 B1 | 12/2003 | Drosset et al. |
| 6,701,355 B1 | 3/2004 | Brandt et al. |
| 6,721,954 B1 | 4/2004 | Nickum |
| 6,735,628 B2 | 5/2004 | Eyal |
| 6,879,963 B1 | 4/2005 | Rosenberg |
| 6,931,451 B1 | 8/2005 | Logan |
| 6,933,432 B2 | 8/2005 | Shteyn |
| 6,941,275 B1 | 9/2005 | Swierczek |
| 6,941,324 B2 | 9/2005 | Plastina et al. |
| 6,944,776 B1 | 9/2005 | Lockhart |
| 6,963,975 B1 | 11/2005 | Weare |
| 6,981,045 B1 | 12/2005 | Brooks |
| 6,990,453 B2 | 1/2006 | Wang et al. |
| 7,028,082 B1 | 4/2006 | Rosenberg et al. |
| 7,076,561 B1 | 7/2006 | Rosenberg et al. |
| 7,103,574 B1 | 9/2006 | Peinado |
| 7,139,723 B2 | 11/2006 | Conkwright et al. |
| 7,146,329 B2 | 12/2006 | Conkwright et al. |
| 7,158,169 B1 | 1/2007 | Farber et al. |
| 7,194,421 B2 | 3/2007 | Conkwright et al. |
| 7,197,472 B2 | 3/2007 | Conkwright et al. |
| 7,236,941 B2 | 6/2007 | Conkwright et al. |
| 7,275,256 B1 | 9/2007 | Del Beccaro et al. |
| 7,325,043 B1 | 1/2008 | Rosenberg et al. |
| 7,343,553 B1 | 3/2008 | Kaye |
| 7,349,663 B1 | 3/2008 | Joseph |
| 7,627,477 B2 | 12/2009 | Wang et al. |
| 7,672,873 B2 | 3/2010 | Kindig et al. |
| 7,681,035 B1 | 3/2010 | Ayars |
| 7,689,705 B1* | 3/2010 | Lester ................ H04L 65/4076 709/231 |
| 7,711,838 B1 | 5/2010 | Boulter |
| 7,747,603 B2 | 6/2010 | Apparao |
| 7,747,708 B2 | 6/2010 | Armstrong |
| 7,751,596 B2 | 7/2010 | Rhoads |
| 7,756,892 B2 | 7/2010 | Levy |
| 7,783,722 B1* | 8/2010 | Rosenberg .......... H04L 65/4084 709/219 |
| 7,827,110 B1 | 11/2010 | Wieder |
| 7,884,274 B1 | 2/2011 | Wieder |
| 7,913,273 B2 | 3/2011 | Del Beccaro et al. |
| 8,001,612 B1 | 8/2011 | Wieder |
| 8,255,488 B2 | 8/2012 | Tanaka |
| 8,260,656 B1 | 9/2012 | Harbick et al. |
| 8,370,952 B1 | 2/2013 | Wieder |
| 8,396,800 B1 | 3/2013 | Wieder |
| 2001/0018858 A1 | 9/2001 | Dwek |
| 2002/0002897 A1 | 1/2002 | Pachet et al. |
| 2002/0010681 A1 | 1/2002 | Hillegass |
| 2002/0019858 A1 | 2/2002 | Kaiser |
| 2002/0046218 A1* | 4/2002 | Gilbert ................ H04N 5/2251 715/203 |
| 2002/0065925 A1 | 5/2002 | Kenyon |
| 2002/0072982 A1* | 6/2002 | Barton ............... G06Q 30/0251 705/14.1 |
| 2002/0077985 A1 | 6/2002 | Kobata et al. |
| 2002/0078029 A1 | 6/2002 | Pachet |
| 2002/0103796 A1 | 8/2002 | Hartley |
| 2002/0120564 A1 | 8/2002 | Strietzel |
| 2002/0120577 A1 | 8/2002 | Hans et al. |
| 2002/0154157 A1* | 10/2002 | Sherr ..................... G06F 21/10 715/716 |
| 2002/0166440 A1 | 11/2002 | Herberger et al. |
| 2003/0001978 A1 | 1/2003 | Smith et al. |

(56) References Cited

U.S. PATENT DOCUMENTS

| | | |
|---|---|---|
| 2003/0014436 A1 | 1/2003 | Spencer et al. |
| 2003/0046213 A1 | 3/2003 | Vora et al. |
| 2003/0046244 A1 | 3/2003 | Shear et al. |
| 2003/0069854 A1 | 4/2003 | Hsu |
| 2003/0135623 A1 | 7/2003 | Schrempp |
| 2003/0183064 A1 | 10/2003 | Eugene |
| 2003/0187953 A1 | 10/2003 | Pearson et al. |
| 2004/0024688 A1 | 2/2004 | Bi et al. |
| 2004/0044779 A1 | 3/2004 | Lambert |
| 2004/0054923 A1 | 3/2004 | Seago et al. |
| 2004/0064209 A1 | 4/2004 | Zhang |
| 2004/0128252 A1 | 7/2004 | Shirai |
| 2004/0199387 A1 | 10/2004 | Wang |
| 2004/0254883 A1 | 12/2004 | Kondrk et al. |
| 2004/0254957 A1 | 12/2004 | Hyotyniemi et al. |
| 2004/0267812 A1 | 12/2004 | Harris |
| 2005/0010531 A1 | 1/2005 | Kushalnagar |
| 2005/0049886 A1 | 3/2005 | Grannan |
| 2005/0197906 A1 | 9/2005 | Kindig et al. |
| 2005/0203992 A1 | 9/2005 | Tanaka |
| 2005/0227674 A1 | 10/2005 | Kopra et al. |
| 2005/0287972 A1 | 12/2005 | Christensen |
| 2006/0056324 A1 | 3/2006 | Hyyppa et al. |
| 2007/0050360 A1 | 3/2007 | Hull et al. |

FOREIGN PATENT DOCUMENTS

| | | |
|---|---|---|
| WO | WO0162065 | 8/2001 |
| WO | WO02067447 | 8/2002 |
| WO | WO02102079 | 12/2002 |
| WO | WO/2005/066735 | 7/2005 |

OTHER PUBLICATIONS

Cohen, Peter. "iTunes 3.0.1 released." Macworld, Sep. 18, 2002, cited in U.S. Appl. No. 10/605,879.

Fanning, David. "Review: iTunes 3.0.1." Macworld, Apr. 1, 2003, cited in U.S. Appl. No. 10/605,879.

Week in Review. Los Angeles Times, May 4, 2003; p. C2. Automatic Music Selection for Changing Driving Patterns available,@ http://www.priorartdatabase.net/IPCOM/000153848/, last accessed Jan. 22, 2008, cited in U.S. Appl. No. 10/605,879.

Home (Computer) Terminal Musical Program, IBM Technical Disclosure Bulletin, Dec. 1, 1980, cited in U.S. Appl. No. 10/605,879.

Wahid, Sa "How Habits are Formed by Our Mind." Oct. 27, 2006. EzineArticles.com. last accessed Sep. 19, 2008 @ <http://ezinearticles.com/?How-Habits-are-Formed-by-Our-Mind&id=339888->, cited in U.S. Appl. No. 10/605,875.

Name That Tune—Wikipedia, the free encyclopedia, pp. 1-12, available @ http://en.wikipedia.org/w/index.php?title=Name.sub.-That.sub.-Tune&prin-table=yes, last accessed Sep. 26, 2008, cited in U.S. Appl. No. 10/605,879.

Csinger et al. AI Meets Authoring: User Models for Intelligent Multimedia, available online at http://www.cs.ubc.ca/labs/lci/papers/docs1995/csinger-air.pdf, last accessed Dec. 18, 2010, cited in U.S. Appl. No. 10/605,879.

Claudine Conrado, et al.; Privacy in an Identity-based DRM System; IEEE Proceedings of the 14th Internatl Workshop on Database and Expert Systems Applications (DEXA'03), cited in U.S. Appl. No. 10/605,879.

Kyung-Ah Chang, et al.; Multimedia Rights Management for the Multiple Devices of End-User, IEEE Proceed. of 23rd Interntl Conf on Distributed Computing Systems (ICDCSW'03), cited in U.S. Appl. No. 10/605,879.

Jonker, et al.; Digital Rights Management in Consumer Electronics Products; IEEE Signal Processing Magazine, Mar. 2004, cited in U.S. Appl. No. 10/605,879.

Koenen, et al.; The Long March to Interoperable Digital Rights Management; Proceedings of the IEEE, vol. 92, No. 6, Jun. 2004, cited in U.S. Appl. No. 10/605,879.

Takanori Senoh, et al.; DRM Renewability & Interoperability; IEEE 2004 p. 424-429, cited in U.S. Appl. No. 10/605,879.

Niels Rump; Can Digital Rights Management Be Standardized?, IEEE Signal Processing Magazine, Mar. 2004 p. 63-70, cited in U.S. Appl. No. 10/605,879.

David Geer; Digital Rights Technology Sparks Interoperability Concerns; IEEE Computer Magazine, Dec. 2004, cited in U.S. Appl. No. 10/605,879.

Walt Rocks: Rating the New Muisc Sites; Wall Street Journal, Oct. 22, 2003, cited in U.S. Appl. No. 10/605,879.

With the Web Shaking up Music, A Free-for-All in Online Songs; Wall Street Journal, Nov. 19, 2003, cited in U.S. Appl. No. 10/605,879.

New Web Music Stores Offer Unique Features, and One is a Winner; Wall Street Journal, Apr. 1, 2004, cited in U.S. Appl. No. 10/605,879.

Claudine Conrado, et al.; Privacy in an Identity-based DRM System; IEEE Proceedings of the 14th Internatl Workshop on Database and Expert Systems Application, 2003, cited in U.S. Appl. No. 10/603,879.

Kyung-Ah Chang, et al.; Multimedia Rights Management for the Multiple Devices of End-User; IEEE Proceed. of 23rd Interntl Conf on Distributed Computing Systems, 2003, cited in U.S. Appl. No. 10/605,879.

"To Catch a Chorus: Using Chroma-Based Representations for Audio Thumbnailing"; Bartsch & Wakefield; Oct. 21-24, 2001, cited in U.S. Appl. No. 10/605,879.

MusicMatch Delivers Breakthrough Music Personalization Service in New MusicMatch Jukebox, PR Newswire, New York, NY, Feb. 22, 2000, retrieved from ProQuest on Feb. 19, 2010, cited in U.S. Appl. No. 10/605,879.

http://www.sonicspot.com/musicmatchjukebox/musicmatchjukebox.html, The Sonic Spot: MusicMatch Jukebox, retrieved on Feb. 19, 2010, cited in U.S. Appl. No. 10/605,879.

http://www.oldapps.com/musicmatch.php, OldApps.com, retrieved Feb. 19, 2010, cited in U.S. Appl. No. 10/605,879.

* cited by examiner

Fig. 5

| User History: | | | | | | | | | |
|---|---|---|---|---|---|---|---|---|---|
| Comp # | Usage-Rights Tokens | Avail locally ? | Current enjoyment | Peak enjoyment | Times heard | Play History. Last heard. | Targeted Time between playbacks | User Control Actions. Feedback History. | Likeability Curves, Functions |
| 854108 | per | y | 100 | 100 | 5 | | | | |
| 35139 | | y | 35 | 65 | 27 | | | | |
| 33865 | u | n | 5 | 85 | 47 | | | | |
| 894185 | n | y | 65 | 65 | s2 | | | | |
| | | | | | | | | | |

Fig. 9

| Aggregate One-to-One Likeability Index: | | | | |
|---|---|---|---|---|
| If Like Comp # | Also liked Comp # | # Users Sampled | # Users Liking both | % Users liking both |
| 854108 | 883491 | 21,603 | 19,226 | 89 |
|  | 103293 | 34,885 | 30,349 | 87 |
|  | 527177 | 22,673 | 17,004 | 75 |
|  | …… |  |  |  |
| 854109 | 1429108 | 1,852 | 1,555 | 84 |
|  | …… |  |  |  |
| 854110 |  |  |  |  |
|  | …… |  |  |  |

Fig. 10

| Aggregate Many-to-One Likeability Index: | | | | | | |
|---|---|---|---|---|---|---|
| If user likes these | | | | | | |
| Comp # | Comp # | Comp # | Also liked Comp # | # Users Sampled | # Users Liking all | % Users liking both |
| 854108 | 883491 | 107389 | 230845 | 19,176 | 15,533 | 81 |
| | | | 632952 | 1,456 | 1,150 | 79 |
| | | | 428503 | 11,062 | 8,628 | 78 |
| | | | ………. | | | |
| 854108 | 883491 | 35139 | 843004 | | | |
| | | | | | | |

Fig. 16

Play-History:
    Anonymous-ownerID.  1304
    Composition-ID.  1603
    Record-of-Play 1  1604
    Record-of-Play 2  1604
    Record-of-Play 3  1604
    ....
    Record-of-Play "m"  1604
    Last Record.  1605
    Number of times played.  1606
    Average % played.  1607
    Validation Hash (digital signature).  1608

Record-of-Play "n":
    Date & Time played.  1702
    Experience-Provider.  1703
    % played.  1704
    Usage-rights TokenID used.  1705
    Likeability indicators  1706
    How initiated.  1707
    Reporting status  1708
    Validation Hash (digital signature).  1709

1604

IDENTIFYING AND PROVIDING COMPOSITIONS AND DIGITAL-WORKS

CROSS REFERENCE TO RELATED APPLICATIONS

This application is a continuation-in-part of U.S. application Ser. No. 11/164,194 filed on Nov. 14, 2005 entitled "Providing Identified Compositions and Digital-Works"; which is a continuation-in-part of U.S. application Ser. No. 11/161,710 filed on Aug. 12, 2005 entitled "Distributing Compositions and Usage-Rights to User-Devices"; which is a continuation-in-part of U.S. application Ser. No. 10/605,879, filed on Nov. 3, 2003, entitled "Adaptive Personalized Music and Entertainment". These earlier applications, in their entirety, are incorporated by reference into this specification.

BACKGROUND OF INVENTION

Field of the Invention

This invention relates to the identification of "interesting" compositions that a user may discover while going about their everyday activities; and later providing the identified-compositions (e.g., digital-works) within a customized sequence of compositions or entertainment stream.

DESCRIPTION OF RELATED ART

Cell phone song-recognition services that can "name-that-tune" (i.e., identify music that is playing near a user) have recently become available. Typically, a user either activates a program already stored in their cell phone or dials a phone number in-order to activate the song-recognition service. The user then holds the phone up to the music (for about 20 seconds) and then several seconds later the song title and artist appears on the phone's screen. In some cases, the user may receive the song information via a SMS (Short Message Service) text message. Users are typically charged a fee of about $1 for each song that is identified. Typically, the captured sound is forwarded to a remote computer where the sound is analyzed. Typical is the technology of Shazam Entertainment Ltd (London, England) which utilizes a database of digital "fingerprints" for more than 2.2 million songs. The identification accuracy depends on various factors including the background noise level. An identified-song is sometimes referred to as a "tagged" song.

In some cases, a list of the user's previously identified-songs may be viewed on a cell phone or in a web browser. In other cases, the user is presented with a web page where the user may activate links to web pages where the user may a) purchase a compact disk (CD) containing the identified-song or b) purchase and download the identified-song to a user's personal computer (e.g., link to the Apple iTunes store). The numerous inconveniences associated with these approaches are discussed below.

Similarly, while a user is surfing the web or using an interactive device, the user may experience or discover compositions which are of possible continuing interest. For example, the user may experience and become "interested" in a composition after hearing a sample portion of it at a web site or hearing it on an internet radio station. As another example, a user may become "interested" in a song used as part of a multi-media presentation or within a video that is playing on a web browser or on a personal computer. In some cases, the user may be provided a link where the user may get additional information or may purchase the composition. The numerous inconveniences associated with these approaches are discussed below.

Some of the numerous limitations and inconveniences associated with links to web pages to acquire compositions include:

- The user is often overwhelmed by the number of possible links available and the maze of links they have activated.
- The user must decide to activate a link to the web page offering the CD or a download of the composition.
- Even if the user follows the link, they must commit to a purchase in the short time the user is still at the web page.
- Even when the user follows the link to the web page, the user may not have enough immediate interest or time to commit to a purchase.
- If the user postpones a purchase, it is unlikely the user will be able to find or return to the offering web page later.
- Typically, once a user has finished with the web page, there is a decreasing likelihood the user will return to it to make a purchase.

Typically, due to the high cost of a CD ($10-20), the user often wants to more extensively sample much of a CD over a period of time before committing to a purchase. Consequently, links to a web page offering a CD containing an identified-composition will have a very low sales rate. Similarly, for downloaded compositions, many users would prefer to become familiar with a composition over a period of time, before having to commit to a purchase.

To increase the time a user spends at a web page and further interest the user in a purchase, web pages sometimes include a sample portion (e.g., test-sample) of the composition. Typically, a user may initiate the playback of a sample of a composition (e.g., song) by pressing a link on a web page. Often, users will not purchase, unless they were previously familiar with the composition. Users typically listen to the sample to confirm the composition is actually what they were looking for (and not another version or composition with a similar title) before deciding to make their purchase. Many users may not decide to purchase a composition until they have reached a certain familiarity over a period of time.

In addition, both purchased media (e.g., compact disks) and songs downloaded to a personal computer have numerous additional limitations and user inconveniences which typically result in few user purchases. These other limitations and inconveniences will now be discussed.

User inconveniences associated with purchased physical media such as CD's, DAT, tapes, and DVD's include:

- The user must expend considerable effort to be able to identify what they want and then to locate the media at a vendor and then purchase it.
- In order to purchase a media, the listener must be able to identify the specific album desired by title, artist and/or other information. Sometimes the listener may purchase the wrong item by mistake.
- Each purchased media may include many compositions that the user does not want.
- Once purchased, the listener must provide physical storage for the media and then later locate and insert the media into a device to playback the compositions. To playback a particular song, the user must remember the particular media (e.g., CD) the song is located on and then be able to find that specific media among perhaps 100's of similar looking media and then locate that song on the CD.

The user must also coordinate and physically transport the media between the user's various locations and user-devices (e.g. home, car, portable player, etc). Often, the desired physical media may not be at the desired user's location.

Media players hold only a limited of number of physical media so the user is limited to a playback stream from a limited number of media at any one time.

For certain locations, such as in an automobile, the locating, handing and inserting the media may be a safety distraction.

The order of playback is limited to the composition order on the media, the random ordering of the media compositions and/or perhaps a playlist the user manually defines.

Physical media (the user's collection) may be lost or damaged from events such as a hurricane, tornado, flood, fire or theft.

The media is subject to scratching or other physical damage which may degrade playback quality over time. The user has to either create backup copies beforehand or purchase replacement copies.

The physical media itself may degrade over time and have a physical lifetime which is much shorter than the users.

In addition, due to the rapid rate of technological change, vendor support for a given media format and their compatible playback devices may be less than the user's lifetime.

User inconveniences associated with downloaded compositions that are stored locally on the hard disk of a user's personal computer [such as Apple iTunes] include:

With Apple iTunes, a user is only allowed to download the composition once per purchase. A user may lose their purchased usage-rights if this local user-device (typically a personal computer) is lost due to an event such as a hurricane, tornado, flood, fire or theft. If lost, the iTunes songs must be purchased a second time before it can be downloaded again.

To protect their iTunes collection from loss, users are responsible for backing up their collection of compositions by copying them from the personal computer to an external storage device or media. Without a backup copy, any damage or loss of the personal computer's hard disk will result in an unrecoverable loss of the user's collection and the user would be required to repurchase and rebuild their collection again from scratch. Many users do not perform regular backups because of the time and effort involved. Even when backups are done, users often keep their backup copies in close proximity to their computer hard drive, which may not protect against loss or damage from events such as a hurricane, tornado, flood, fire or theft.

With Apple iTunes, a purchased song may be authorized for use on only 5 user-devices (of an authorized type) at a time. The user is required to perform a complicated procedure to transfer a song and obtain authorization to use the song on each new user-device. In order to authorize the use of a song on a new user-device, the user may be required to enter the Apple-ID and password used to purchase the song. When the 5 user-device limit is reached, the user is also required to manually de-authorize a song on one user-device so it can be authorized on another user-device. The user must also remember to de-authorize their computers and user-devices whenever they are sold, given away or are serviced.

Transfers of iTunes usage-rights to other user-devices (such as a portable player) are typically accomplished by a cable or local area wireless connection between the PC and the second device. This typically requires the other user-devices to be brought near the PC or local media server where the user's usage-rights are stored. In addition, the user must plan and coordinate bringing the devices together whenever a transfer of usage-rights is desired. Such transfers are particularly difficult when the user-devices are at different physical locations (such as home, work, automobile, etc.) or are not easily portable.

Overall, an iTunes user must expend significant time and effort to acquire, download, backup, and transfer songs between their user-devices and to authorize/de-authorize their collection of songs at each user-device.

What is desired is an easy and convenient way to identify and provide unknown but interesting compositions that a user may discover while going about their everyday activities.

Summary of Invention

Exponential advances in digital electronics and networking may allow a customized sequence of digital compositions (e.g., digital-works) to be automatically provided and continuously adapted for each user. The customized sequence may include compositions already known and/or owned by the user; as well as compositions and/or composition-highlights which may be unfamiliar to the user. While going about their everyday activities, a user may discover an "interesting" composition. For example, an "interesting" composition may be emanating from an external source (e.g., background music in a restaurant) or may be encountered while using an interactive device (e.g., surfing the web); or information (e.g., a magazine article or advertisement) about/associated with a composition may be encountered by the user. The user may explicitly and/or implicitly indicate an "interest" in a composition when encountered in their everyday activities. Part of the "interesting" composition and/or information associated with the "interesting" composition may be captured. The "interesting" composition may then be identified by analyzing the captured information. A composition and/or composition-highlight related to the identified-composition may be provided one or more times; within a customized sequence of compositions that is generated and/or adapted for each user. The provided-composition may be added to the user's favorites or library. Usage-rights for the provided-composition may be acquired for the user. The composition may be any type of digital-work including music, sound, text, image, video or other media. In some cases, the composition may be an advertisement for a product or service.

The primary objectives and advantages of this invention include:

(1) Provide "interesting" compositions that the user may encounter during everyday activities such as: a composition emanating from external sources (e.g., occurring in the background environment); or encountered while surfing/browsing web pages; or mentioned in a magazine article or advertisement.

(2) Not require the user to know the composition title, artist's name, album name or other composition information; in-order for it to be provided to or acquired by the user.

(3) Allow the user to experience an identified-composition and/or an identified-composition highlight; multiple times in the relaxed listening environment of a customized sequence of compositions; before making a decision to acquire.
(4) Allow the user to more easily acquire and/or utilize compositions.
(5) Use the same simplified method used to sample and acquire other compositions; to also acquire identified-compositions.

Other objectives and advantages of this invention include:
(1) Provide an entertainment experience that is customized for each user and simple to use.
(2) Simplify the process of finding and acquiring a larger variety of pleasing compositions for each user's collection.
(3) Simplify the purchase and delivery of compositions to create a user's collection.
(4) Protect a user's collection of compositions against the theft or loss.
(5) Eliminate all user efforts and concerns with backing-up and storing their personal collection of compositions (digital-works).
(6) Preserve a user's profile, history and collection even if user-devices are lost, stolen, broken or destroyed.
(7) Eliminate user efforts of knowing, locating or converting different file formats for different user-devices and future user-devices.
(8) Allow each user's profile, history and collection to be available to all the user-devices wherever they are located or used. Allow each user's profile, history and collection to be immediately available to any user-device not previously used by the user (a new purchase, a friend's, etc.).
(9) Automatically manage the user's collection of compositions. Allow user's compositions to be usable anywhere the user is. Automatically distribute, as needed, the user's compositions (collection) to any user-device where the user is active. Eliminate all user efforts to transfer their compositions between user-devices.
(10) Provide a simple and intuitive user interface that is similar to existing user-devices that users are already familiar with.
(11) Provide such a superior experience and ease of use (compared with pirated alternatives) that user's will prefer to pay for such convenience.

BRIEF DESCRIPTION OF DRAWINGS

FIG. 5 illustrates an embodiment of a user history database.
FIG. 9 illustrates an embodiment of an Aggregate Common Likeability Database.
FIG. 10 illustrates an alternate embodiment of an Aggregate Common Likeability Database.
FIG. 16 illustrates an example of the contents of a playback history.
FIG. 17 illustrates an embodiment of the contents of a record of a single playback.

DETAIL DESCRIPTION

Figure 19:
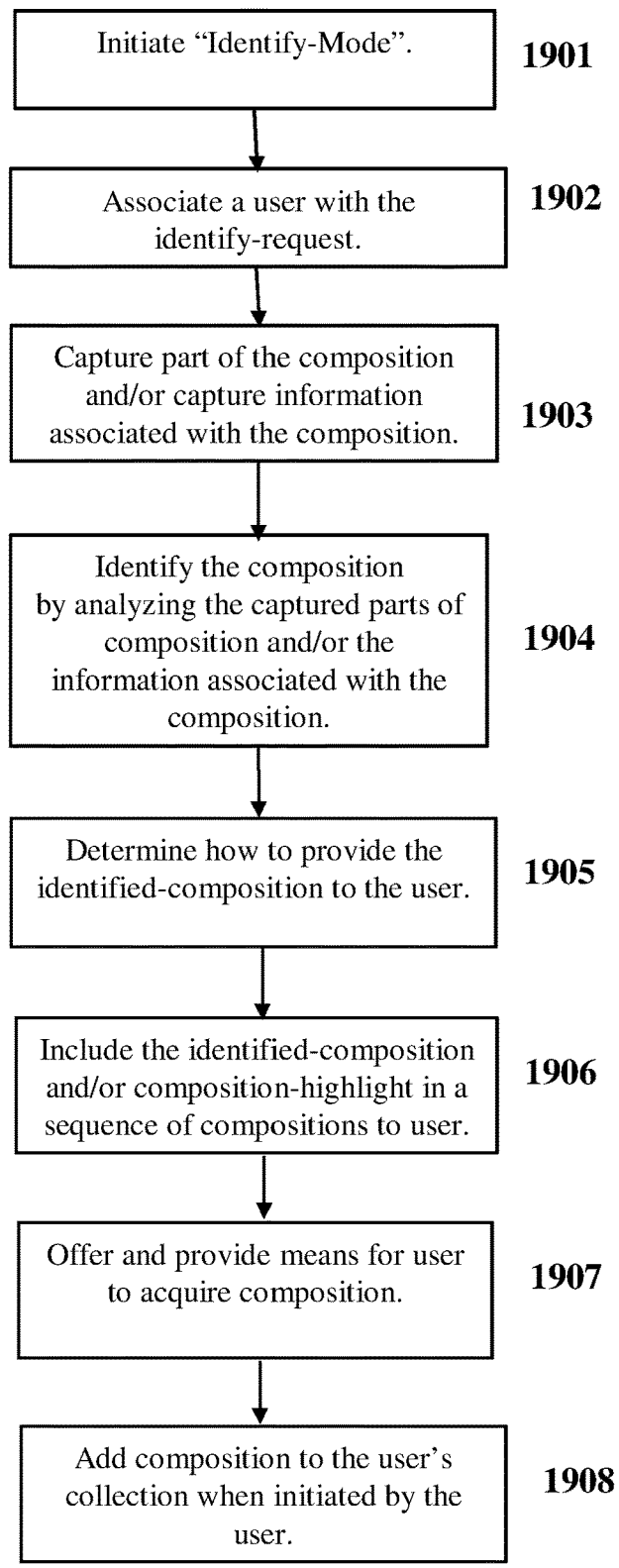
FIG. 19 is a flow diagram illustrating one embodiment of the capturing, identifying and providing of an identified-composition to a user.

While a user is conducting their everyday activities, they may become "interested" in a composition they happen to experience or see information about. Some examples where a user may become "interested" in a composition include:
An "interesting" composition may be emanating from an external source such as a composition 1) Playing in a public venue (e.g., background music at a restaurant) or 2) Playing at a friend's house 3) Playing on broadcast radio or television.
The user may see a portion of a movie, a video, a movie trailer, or a television program.
The user may see a magazine article or advertisement about the composition.
The user may see a poster or a billboard advertisement for a composition.
The user may become interested in a composition while listening to an internet radio station or a podcast.
The user may be sampling music or another type of composition at a web site.
The user may experience or discover compositions which are of possible continuing interest while surfing the web or using an interactive device or personal computer.
The user may become interested in a song used as part of a multi-media presentation or within a video that is playing on a VCR or DVD or web browser or on a personal computer.
As another example, the user may happen to see or hear an advertisement for any type of product or service that they are "interested" in. The user may initiate the identify-mode, so that a composition (digital-work) with information about the product may be provided at a later time in a sequence of compositions or digital-works.
FIG. 19 is a flow diagram illustrating one embodiment of the capturing, identifying and providing of an identified-composition to a user.

The first step is to "initiate the identify-mode" 1901. The user may explicitly (e.g., take specific action) or implicitly initiate the identify-mode.

The next step is to "associate a user with the identify-request" 1902. This may allow the identified composition to ultimately be provided to the initiating user. The actual user's identity may remain anonymous.

The next step, is to "capture part of the composition and/or capture information associated with the composition" 1903. The information captured may include: 1) part(s) of the composition itself and/or 2) information about/associated with the composition. In some embodiments, a capture-device may be used.

The next step, is to "identify the composition by analyzing the captured part(s) of the composition and/or analyzing the information associated with the composition" 1904.

The next step is to "determine how to provide the identified-composition to the user" 1905. This may include whether to provide the composition and the details of providing the composition and/or composition-highlight to the user.

The next step is to "include the identified-composition and/or composition-highlight in a sequence of compositions to the user" 1906. The full composition and/or portions of the composition (e.g., composition-highlights) may be provided to the user in a customized sequence of compositions.

The next step is to "offer and provide means for the user to acquire the composition" 1907. The user may be offered various terms and/or ways to acquire a composition that is playing in a customized sequence.

The next step is to "add the composition to the user's collection when initiated by the user" 1908. If the user acquires the composition it may be automatically added and maintained in the user's library and may be automatically provided when needed to any user-device where the user is active.

In some embodiments, these steps may be performed in a different order and/or some steps may be combined into a single step and/or a subset of these steps may be used.

In particular, steps 1907 and 1908 may not be used in some embodiments. For example, in some embodiments of a subscription service that allows unlimited access for a fixed-fee per time period (e.g., monthly fee), compositions may not be offered for purchase, so steps 1907 and 1908 may not be performed. However, the user still benefits from being able to identify compositions during everyday activities that can be enjoyed and provided by the subscription service in a customized sequence of compositions and then added to the user's favorites and/or playlists.

Each of these steps and some of the possible variations in their detailed embodiments and implementations are described below.

Initiation of the "Identify-Mode":

The user may explicitly or implicitly initiate the identify-mode.

For explicit initiation, the user may explicitly interact with a user-device in-order to initiate the identify-mode. For example, the user may press a button (or a set of buttons) or speak a command or gesture in a way a user-device may recognize as an identify-mode request. For the manually controlled user-device illustrated in FIG. 4, the user may initiate the identify-mode by pressing the "capture" button 46 while the composition is emanating from a source external to the user-device. In general, any method of signaling a user request to a user-device may be utilized to explicitly initiate the identify-mode. In general, an explicit initiation by the user may be considered a very strong indication that the user is interested in the composition.

For implicit initiation, the user is not required to make an explicit request to initiate the identify-mode. Instead, the identify-mode may be automatically initiated whenever proxies indicative of user interest and/or excitement satisfy certain requirements. Examples of such proxies include the amount of time spent listening or viewing something; the user's reactions; brain wave patterns; facial expressions; muscle tensions; pulse; blood pressure; etc. Any type of implicit initiation may be used. In general, an implicit initiation may not be as accurate and may have a higher false alarm rate; compared with an explicit initiation. In addition, there is a possibility of a false implicit initiation when there is no composition to be "identified".

Associating a User with the Request:

A specific user may be associated with the explicit or implicit identify-request. Knowing the specific user, allows the identified composition to be provided to that user at a later time. As discussed elsewhere, a specific user may be associated with the request while the actual user's identity remains anonymous.

For user-devices that are used by only by a single user (e.g., cell phone), the user may be identified by a unique number(s) associated with the specific user-device. For example, a phone or cell phone may be identified by one or more numbers that uniquely identify each specific cell phone and its implied user.

For user-devices that may be shared by a plurality of users, there are many methods that may be used to identify the specific user that initiated the identify-mode request. As described elsewhere in "Identifying the Specific User", these may include user-ID/password, biometrics, electronic-ID-cards, RFID tags, etc. The user identification method(s) may be shared with other user-device operating modes such as logon or security.

Capturing Information about the Composition:

The information captured may include: 1) part of the composition itself and/or 2) information associated with the composition which may be used to uniquely identify it.

What needs to be captured and how it is accomplished may be dependent on user's situation and the technical capabilities of the source of the "interesting" composition. There are at least three fundamentally different approaches:

(1) Capture parts of the composition as it emanates by using a capture-device.

(2) Capture information associated with the composition (but not the composition itself) by using a capture-device.

(3) Capture information associated with the composition from the originating device itself without using a special capture-device.

The captured parts of the composition and/or information associated with the composition may then be analyzed to identify the specific composition. Note that combinations of these fundamental approaches may be used to improve the accuracy of the identification. For example, using both 1) capturing part of the composition and 2) capturing information about the composition, may provide greater identification accuracy. These fundamental approaches will now be discussed.

Capturing Part(s) of an Externally Playing Composition using a Capture-Device:

In approach 1, one or more parts of the externally playing composition may be captured using a capture-device appropriate for the composition type. This approach may be used when the composition originates from an "external" source that is not under the user's control or is not networked to the user's experience-provider 26 or other provider. Some examples of "external" sources from which an "interesting" composition may be emanating include:

Background music playing in a public venue (e.g., a restaurant).
Music or other compositions playing on an entertainment unit at a friend's house.
A basic radio or television broadcast.
A movie, a VCR/DVD video, a movie trailer, or a television program.
A source device the user is unable to interface with or interact with or control.
A source device that is unable to communicate (e.g., network) with the user's service providers or the user's other devices.

The details of the capture-device are provided elsewhere. The parts of the composition that are captured by the capture-device may then be analyzed to identify the composition.

Capture Information Associated with the Composition using a Capture-Device:

In approach 2, information associated with the composition (but not the composition itself) may be captured using a capture-device. For example, Imaging the composition's packaging (CD or DVD packaging).
Capturing an audio description of the composition before or after the composition has played.
Imaging a bar code or an ID number associated with the composition.
Imaging a print advertisement about/associated with the composition.
Imaging a written review about the composition.
Imaging a poster associated with the composition.
In general, capturing any images or sound associated with the composition.

The details of the capture-device are provided elsewhere. The information about/associated with the composition that is captured by the capture-device may then be automatically analyzed to identify the specific composition.

Obtain Information Directly from the Source Device:

In approach 3, information associated with the composition may be captured within and obtained directly from the originating device without using a separate capture-device. This may be useful when the composition originates from a "smart" device that has information about the composition and has software that can capture composition-information and communicate with the user's providers and/or the user's other devices. The identify-mode may be initiated either explicitly or implicitly; within the source device. Information about the composition may be captured in the source device itself and made available for identification of the specific composition. The "capture" software program may automatically forward the captured information associated with the composition to the identification processing.

As an example, a user may come across an "interesting" composition during normal web surfing. The user may explicitly take action(s) to initiate the capture of information about the "interesting" composition by a "capture" software program running on the web surfing device (i.e., the source device).

The "capture" software may be an add-on program that may run on the user-device or within the web-browser (i.e., source device) to capture composition-information from the web page and/or its hyperlinks. For example, the capture program may be a separate (e.g., compiled) program that runs directly on the user-device and/or its operating system. Alternatively, the "capture" software may be a Javascript, Java or AJAX (Asynchronous JavaScript & XML) plug-in that runs inside a web browser (or other application) that is the source of the composition and/or information associated with the composition.

In general, any type of explicit initiation may be used to initiate the identify-mode in the source-device (user-device), including:

"Clicking" on text or an image on a displayed page or on a pop-up menu or pop-up window.
Pressing a certain keyboard sequence or combination.
Pressing certain combinations of mouse and/or keyboard buttons.
Speaking a certain verbal command(s).
Making gesture commands.

Any type of explicit user action may be used to cause the "capture" software to capture the information associated with the composition and then provide it to the identification analysis.

In one example of explicit initiation of the identify-mode, the user may mouse-click on a pop-up window that appears near the displayed composition information/image. In another example, the user may hold down the "ALT" key while clicking the mouse when the cursor is near the displayed composition information/image. In another example, the user may use a right mouse-click to activate a pop-up window which includes an "identify-mode" selection that is activated with a left mouse-click.

As an example of implicit initiation of the identify-mode, the source-device (user-device) may automatically detect that the user is test-sampling a composition at a web site. For example, while web surfing, the user may initiate the playback of a sample portion of a composition at a music web site in a web browser. Once the user has started playback of the sample-composition, the information associated with the composition and the user-ID may be automatically captured and forwarded (across a network) for analysis processing without the user taking any specific action to initiate the identify-mode.

As another example of implicit initiation of the identify-mode, a software application or browser plug-in/add-in may automatically detect the activation of compositions with certain file types (e.g., MP3). Information about the activated composition such as title/artist or other information may be captured and transferred to an analysis processor. The captured information associated with the composition may then be used to identify the specific composition.

Implicit initiation may also be dependent on exceeding certain thresholds such as:

The percentage of the composition-sample that was played.
The number of times a composition-sample is played.
Whether the composition-sample is repeated.
Amount of time spent at composition information.
Prior user history with that composition.

In some cases the captured information associated with the composition may be HTML or XML information that appears on the web page and/or is associated with the composition. In other cases, the information may be obtained by following a link (URL or URI) on the web page to information associated with the composition. In some cases, the information associated with the composition may be a unique composition-ID or other unique-identifier.

Capture Devices:

The capture device may be capable of capturing part(s) of the composition itself and/or information associated with the composition that is sufficient to specifically identify the composition.

One or more parts of an externally playing composition and/or information associated with a composition may be captured using a capture-device appropriate for the composition type or associated information. Examples of capture-devices include a microphone, a still image camera, a moving image camera, a video camera (capture moving image and sound), or any other capture-device.

The capture-device may only need to sample a subset of the audio and visual components of the external composition or information associated with the composition. For example, sound alone may be used to identify compositions that contain a sound component even when there are other (e.g., visual) components to the composition. For example, captured sound alone may be used to identify music, music videos, movies and television programs and any type of multi-media containing sound without capturing any of their image components. As another example, a still image camera may capture one or more images that may be sufficient to identify a video, television program, artwork, or other media containing a static or dynamic (i.e., changing) visual content. Similarly, other type capture-devices may be used to capture other components of a composition. For the user-device illustrated in FIG. 4, sound may be captured by the microphone 47.

The capture-devices may be shared with other user-device modes. For example, the input microphone used for the identify-mode; may also be used for other user-device functions such as telephone voice input, voice recognition (e.g., command recognition), and other user-device operating modes using a sound input.

Devices used to capture a user's life-history may also be used for composition capture. For example, in the future almost everything the user sees and/or hears may be automatically captured into a user's life-history. For example, a video camera may be incorporated into a user's glasses or clothing such that everything that the user looks at may be captured into a user's history. Similarly, a microphone worn by a user may capture everything that a user hears.

One or more analog-to-digital converter(s) (ADC), located either internal or external to the user-device, may convert the analog signal captured by the capture-device (e.g., microphone) into digital samples. The captured signal(s) may be converted from an analog to digital form by one or more ACD(s). In one preferred embodiment, the ADC(s) may be located in the user-device and the capture-device digital data may be processed and transferred elsewhere over a network or communication path for further analysis.

Alternatively, the ADC(s) may be located external from the user-device and analog communication channel(s) may be established from the user-device to the externally located ADC. For example, sound may be captured and sent from an analog cell phone and transmitted across an analog cell phone network to an external location where an analog cell-phone call is received and the sound converted into a digital sound segment by an ADC(s).

The duration of the captured portion of the composition necessary for identification may be automatically determined by the capture-device or by the analysis processing. The capture duration may be a fraction of a second to tens of seconds. The user-device may optionally provide an audio and/or visual indication to the user that the capturing of the composition has concluded. Identification accuracy may be reduced if the user begins the capture process so late, that the desired capture duration is not met before the composition has ended.

As an option, certain user devices may support capturing the composition prior to the explicit or implicit initiation of the identify-mode. For embodiments with a life-history device, "x" seconds of life-history that occurred just prior to initiation of the identify-mode may be used in the analysis. In another embodiment, the most recent "x" seconds of capture-device output is continuously saved into a rolling-buffer and "x" seconds of data prior to initiation would always be available. The advantages of utilizing pre-initiation data include:

The identification may be completed sooner after initiation; since the time to acquire sufficient data is reduced or eliminated.

The identification accuracy may increase for cases when the initiation occurs near the end of the composition since an earlier part of the composition (before initiation of the identify-mode) is available.

A clock and Global Positioning System (GPS) circuitry may also be located within the capture-device in-order to capture the user's location and the time of an identify-request.

Identifying the Composition:

The composition may be identified by analyzing the captured part(s) of the composition and/or analyzing the information associated with the composition. The analysis may be performed inside the user-device or by processing external to the user-device or by a combination of pre-processing by the user-device along with processing external to the user-device. The different types of analysis will now be discussed.

Analyzing Captured Part(s) of the Composition:

In one embodiment, the user-device may perform pre-processing on the captured digital signal in-order to reduce the amount of data that needs to be forwarded to the external processor. Examples of such pre-processing at the user-device could include a) compression or b) pre-calculating fingerprint samples of the captured signal or c) extracting watermarks or d) pre-selecting the more distinct portions of the composition.

In one preferred embodiment, captured digital composition segments representing the captured signal may be forwarded across a network by the user-device to a processing capability attached to the network. The user identifier may also be transferred across the network to the external processing capability. The network may be any type of network including a cell-phone network or the Internet. In the case when the user-device is a cell-phone, a portion of the composition may be sent directly across the cell-phone network to a pre-defined phone number (e.g., a toll-free 800-number) where the identification process is performed.

When the user may not be interested in the "name that tune" mode [quickly getting information (e.g., title, artist, etc) about the composition]; the identification process may be delayed until a network connection becomes available or until a lower cost network connection can be established. In this case, a portion of the composition is captured in user-device memory until later transfer across a network to an external processor.

The external processor may be a computer with the capability of interfacing with the network in-order to receive the sound sample from the network and store them into memory. The processor may process the sound segment(s) in-order to extract one or more "fingerprints" that represent portions of the captured composition. The extracted fingerprint(s) may then be compared and matched against a database of previously created fingerprints for known compositions.

An example of existing music (sound) identification processing is the technology of Shazam Entertainment Ltd (London, England) which utilizes a database of digital "fingerprints" for more than 2.2 million songs.

To enable faster and more accurate identification of the composition, watermarks may be embedded inside the composition. Identification processing may then include detecting and extracting the watermark(s) and then determining the composition the watermark is associated with. Watermarks may also be used in combination with other identification techniques to increase the identification accuracy rate.

In one embodiment, the captured composition segments may be forwarded over a phone network (e.g., cell-phone network) and/or the Internet for identification by an external processor. The captured composition segments may be forwarded directly from the user-device to the external processor or may be forwarded through the experience-provider 26 to the external processor. The external processor may be part of the experience-provider 26 or may be performed by an independent provider.

Once the composition has been identified by the external processor; the external processor may forward the capture-request, a user-ID and ID of the identified-composition to the experience-provider 26 and/or the usage-rights repository 24. In some embodiments, a record of all identified-compositions for each user may be maintained by the usage-rights repository 24 for use by all experience-providers 26.

In some cases (e.g., background noise or too short a capture segment), the result of the identification processing may be ambiguous such that a single composition can not be identified with a high level of confidence such that two or more compositions may be identified as identification-possibilities.

Similar methods may be used to analyze other components of multi-media. For example, one or more still images (or images from a video camera) may be used to identify the visual component of a composition (movie, television, artwork, etc). The composition may be identified by comparison against a collection of "fingerprints" of known compositions.

The identification accuracy may be improved by using identification results from two or more components of multi-media. For example, a video may be more accurately identified by capturing and analyzing both the sound and visual components.

Once the identification has been made, an indication of whether identification was successful and information about the identified-composition may optionally be made available to the user at the requesting user-device (e.g., "Name that composition").

Analyzing the Information Associated with the Composition:

The captured information associated with the composition may be analyzed in-order to uniquely identify the composition. In one preferred embodiment, the analysis of information associated with the composition is performed in a processor located across the network from the capture-device or user-device containing the capture-device.

The information associated with a composition may have different levels of ambiguity. For example, an HTML (Hypertext Markup Language) web page with only title and artist information may have ambiguity associated with the meaning of the information. While XML (Extensible Markup Language) my have a lower ambiguity associated with it, since the XML-schema may define a specific meaning or definition for the information. The ambiguity of the associated information may be considered in the analysis that uniquely identifies the composition.

In some cases, analysis may be simplified when information that uniquely and unambiguously identifies the composition (e.g., a unique composition-ID with an XML tag) was captured.

Those skilled in the art will realize that various methods can be used to simplify and improve the accuracy of the analysis. Some examples include placing:

Unique image watermarking within composition related materials (such as packaging, posters, advertisements, etc.) that can be detected in the capture-device data.

Bar-codes or unique image codes or unique identification numbers on composition related materials.

Unique audio identification before or after the composition.

Audio watermarking within the composition itself.

Audio watermarking before or after the composition.

Using XML tags and XML-schema in-order to define the meaning of elements on a web page or information structure.

Determining How to Provide the Identified-Composition:

This may include determining whether and how to provide the identified-composition to the user. In some cases the actual identified-composition and/or composition-highlight of the identified-composition may be provided to the user. In other cases, a composition and/or composition-highlight related to the identified-composition may be provided to the user. The "providing of an identified-composition or highlight" may be used to refer to:

Providing the actual identified-composition or highlight and/or

Providing a composition or highlight that is related to the identified-composition.

If the identified-composition corresponds to an advertisement for a product or service the user is interested in (and the user's plan permits advertisements); advertisement-compositions may be selected that are tailored to that user's interest and provided within a sequence of compositions. For example, the user may initiate the identify-mode upon seeing an "interesting" magazine article or advertisement for a certain automobile. Information about that automobile may be provided later via video and/or audio compositions that are placed within in a customized sequence of compositions. For advertisement supported service-plans, the user may be credited for the amount of time being exposed to advertisements including identified-advertisement-compositions.

The identified-composition may be checked against a list or database of compositions already in the user's collection/library/favorites to determine whether the user already owns and/or is familiar with the identified-composition. This is performed since it is possible that the user may not realize the identified-composition is already in the user's collection or favorites. If the composition is already in the user's collection, the composition may not be marketed to the user. Instead the user's likeability rating for the identified-composition may be increased and the time between playbacks of the identified-composition may be decreased (i.e., the composition may be more frequently played-back).

If the identified-composition is not already in the user's collection/library, an analysis may be performed to decide whether the composition may be provided and/or marketed to the user. The analysis may include any of the following considerations:

- The user's service plan (e.g., ownership versus rental plans).
- The amount of user interest in the identified-composition as implied by the explicit or implicit initiation.
- Consistency of the identified-composition with the user's prior history and collection(s).
- Whether the same composition has been previously identified for the user.
- The extent the composition has been previously provided and/or marketed to the user; prior to latest identify-mode request.
- The user's prior history of using the identify-mode (e.g., the percentage of prior identify-requests ultimately purchased/acquired by the user).
- How long the user and/or account has been established or active.
- User's profile.
- User's account status.
- The size of the user's collection (e.g., prior purchases) or the user's history of composition purchases.
- The user's credit report or credit rating.
- The user's available account balances.
- History of improper behavior within the user's account.
- Whether free usage-rights for a limited number of playbacks can be obtained or authorized for the user.
- User feedback about the identified-composition or highlight while it is active/playing.
- Other suitable criteria.

If usage of the identified-composition is already authorized in the user's service plan (e.g., an unlimited composition rental for a fixed monthly fee), the identified-composition may be easily provided to the user.

The decision to provide and/or market the identified-composition may be computer automated based upon user attributes satisfying a set of pre-defined parameter values. For example, a decision to market may be met if a) the user's numerical credit rating exceeds a threshold value and b) a certain number of free playbacks can be obtained for the user. For example, approval for a certain number of free playbacks may be automatically authorized whenever a user meets a pre-defined set of values.

For the case where there was an ambiguous identification or multiple identified-composition possibilities, each of the identified-possibilities may be further evaluated for potential user likeability based on the user's collection and prior history. Those compositions in the list of identified-possibilities that satisfy an acceptable: a) identification accuracy and b) consistency with the user's likes; may be provided and/or marketed to the user in a sequence of compositions. In some cases, a decision may be made to not provide and/or market any of the identified-possibilities to the user. In one preferred embodiment, the decision to market is automatically determined by a computer analysis.

A composition in another type-media that either contains or is related to an identified-composition may also be marketed to the user. For example, if the user requested that a movie be identified; one or more songs from the movie sound track may be marketed to the user by interspersing them in the composition sequence on audio user-device(s). As another example, videos/movies that contain an identified-song may be marketed on a video-capable user-device; even though the song was identified on an audio user-device. As another example, a video highlight, which includes a portion of the identified-song (that had originally prompted the user to initiate the identify-mode) may be interspersed in a sequence of compositions.

Providing the Identified Composition:

A full composition (e.g., full digital work) and/or a highlight related to the identified-composition; may be interspersed within a sequence of compositions generated and/or adapted for the user. Whether the full composition and/or composition-highlights are provided may depend on the user's service-plan and the other factors discussed elsewhere in this description. The creation of a sequence of compositions for the user may be performed by the experience-provider 26 as described elsewhere in this description. As described elsewhere, the user may have the option of forwarding past or repeating (and providing feedback) about any provided composition.

As described elsewhere, before adding the identified-compositions to a sequence, the experience-provider 26 may request and obtain free limited usage-rights (for the user) for the identified-composition or highlight. The free limited usage-rights may allow the marketing of the identified-composition to the user for a multiple times over a period of time.

Each identified-composition may be integrated into the process for generating a customized sequence of compositions. In one embodiment shown in FIG. 8, identified-compositions 89 may be used as an additional input to the "recommendation generator" 82 so that an identified-composition (that satisfies the screening/providing requirements) may appear within the "recommended list of new compositions and highlights for the user" 87.

Figure 3:
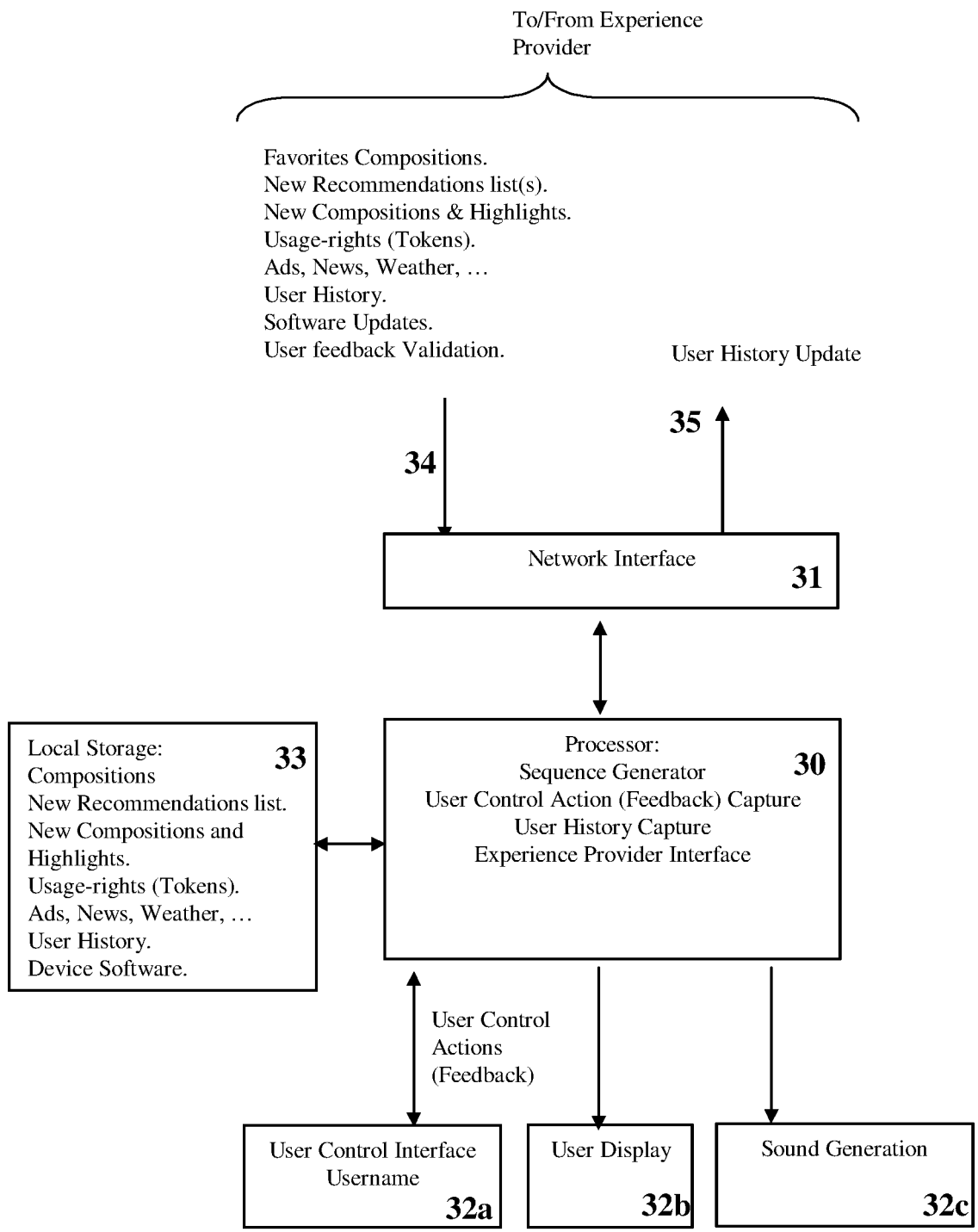
FIG. 3 is a functional diagram of a user-device such as a personalized music player.
Figure 6:
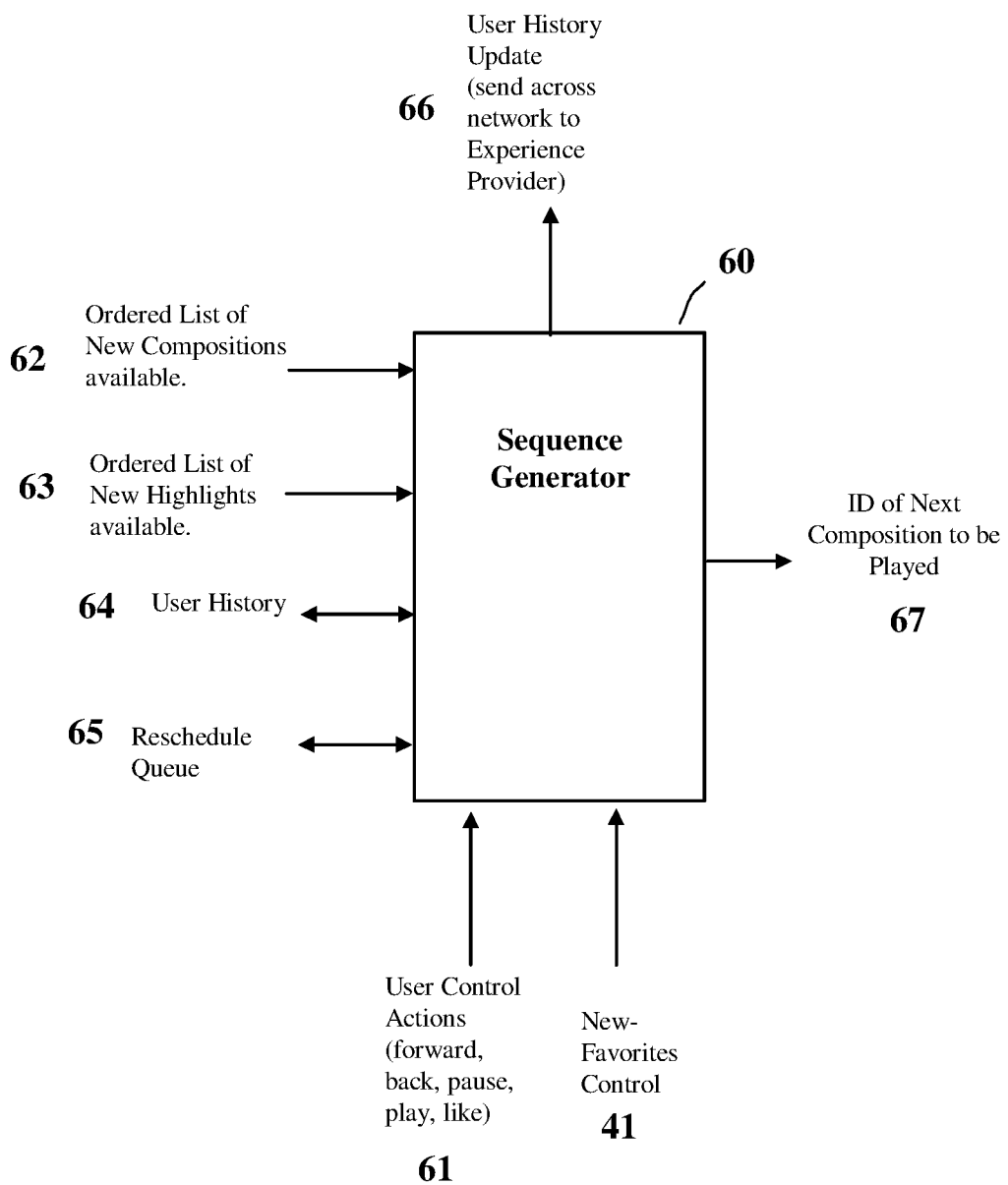
FIG. 6 illustrates the functional flow of a Real-time Sequence Generator.

In one embodiment shown in FIG. 3, the identified composition and/or highlight may then be included in the information 34 transferred to the network interface 31 of the user-device. The information 34 needed for an identified-composition may be included the "new recommendation list(s)", the "new compositions and highlights" and "usage-rights (tokens)". The identified-composition may then be automatically interspersed in a customized sequence of compositions at any user-device as shown in FIG. 6 and as described elsewhere.

This allows the user to experience a portion of the identified-composition (e.g., a highlight) or the full composition as part of normal sequence of compositions that is customized for the user. The user may automatically experience the identified-composition or highlight at any of the user-devices 22 where the user is active.

Offering and Acquiring an Identified-Composition:

As described in some embodiments elsewhere, the user may be offered various terms or ways to acquire a composition that is playing in a sequence. For example: before, during or after the playing of the identified-composition, the user may be presented with verbal or visual information about the composition.

The location and date/time that an (explicit) identify-request occurred may be verbally announced just prior to the playback of an identified-composition or highlight (e.g., "identity-request at joes Restaurant on Oct. 23, 2005").

As described elsewhere, the user may then provide feedback about the identified-composition or highlight while it is playing. Such feedback may indicate the user's interest in the composition and may be used to determine whether and how frequently the composition may be provided and/or offered in the future.

As described elsewhere, the user may take action in-order to acquire the identified-composition or to add the identified-composition to the user's collection/library. The user action to acquire the composition may be explicit (such as activating a "buy" control/button) or implicit (such as exceeding a "positive feedback" threshold).

The use of implicit or explicit user actions may depend on the experience-providers business model and the user's agreement/plan for composition purchases. In one embodiment of explicit acquisition: the user may confirm/authorize each acquisition/purchase by initiating specific control action(s). In one embodiment of implicit acquisition: the composition may be automatically acquired and added to the user's collection whenever successive positive user feedback raises the user's "likeability" number above a certain threshold value.

Adding a Composition to a User's Collection:

In some embodiments, the composition may be acquired and/or added to the user's collection when initiated by the user. As described elsewhere, this may include acquiring usage-rights for the user and/or adding the usage-rights to the user's collection. This may also include facilitating user payments in exchange for the usage-rights.

As described elsewhere, the usage-rights may be stored in a redundant network repository so they may be automatically protected against loss. As described elsewhere, the usage-rights and compositions may be automatically distributed and used for playback at any user-device where the user is active.

Based upon the user's service plan, the user may explicitly and/or implicitly initiate the acquisition of the composition. Examples of explicit types of user action are described elsewhere. In a preferred embodiment, the user action that explicitly initiates an acquisition may be different from the action that initiates the identify-mode. Implicit user action that initiates an acquisition may be based upon the user's service plan.

Figure 11:
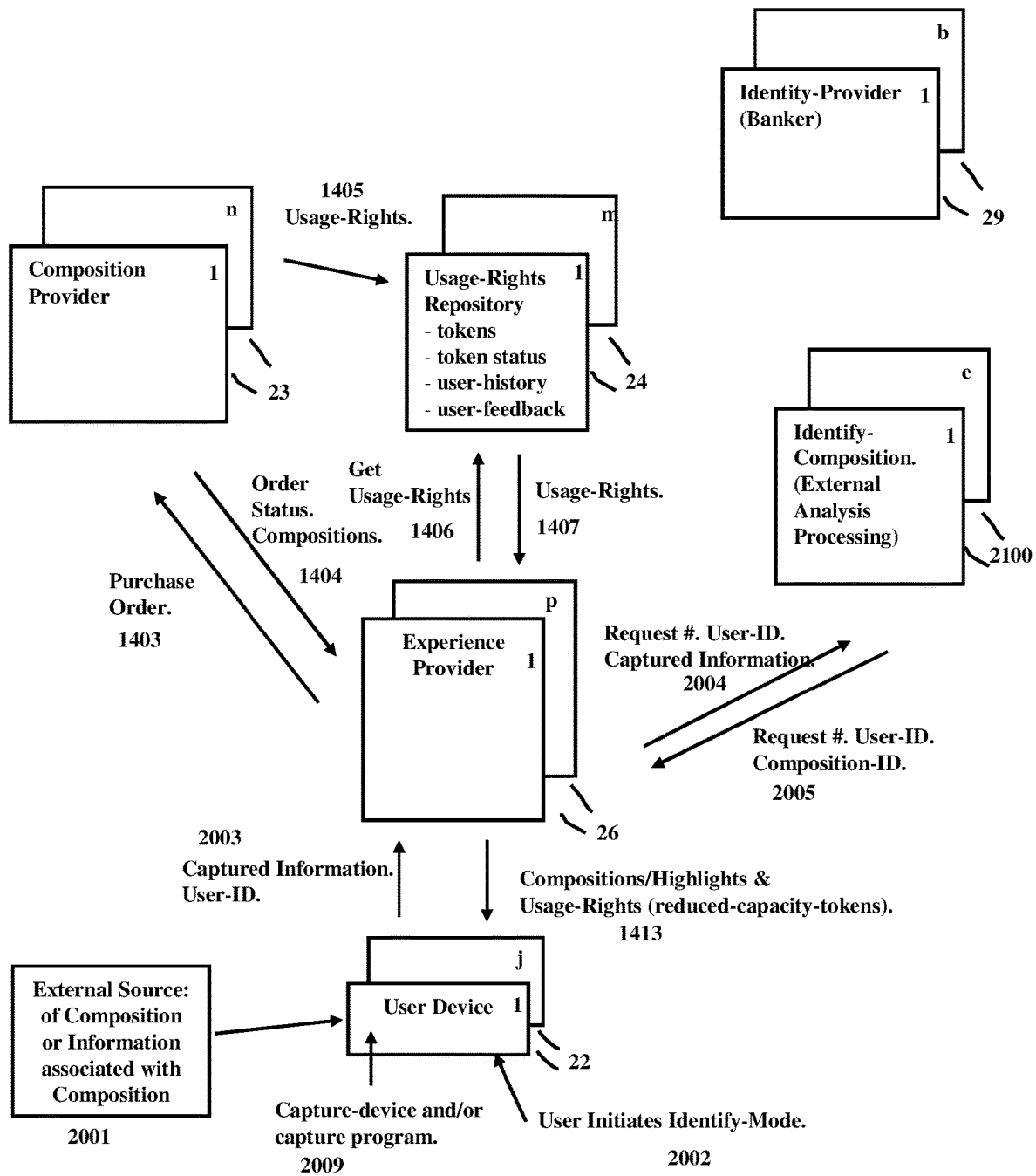
FIG. 11 illustrates one embodiment of the information flow associated with capturing, identifying and providing as identified-composition to a user.

Information Flow to Identify and Provide "Interesting" Compositions:

FIG. 11 illustrates one embodiment of the information flow associated with capturing, identifying and providing an identified-composition to a user. This example assumes all user-devices are networked directly to and through the experience-providers 26. This may be desirable [for security reasons] where user-device communications utilize portions of the Internet.

The user may become interested in a composition that is originating from an "External Source" 2001. Or, the user may become interested in a composition based on information about the composition, coming from an "External Source" 2001. The user may then use a capture-device (e.g., part of a user-device 22) to capture part of the composition or capture information associated with the composition emanating from the "external source" 2001. The user may take explicit or implicit action to "initiate the identify-mode" 2002 in the capture-device (e.g., user-device).

Alternatively, the user may become "interested" in a composition when interacting with an application (e.g., web browser) within a user-device 22. The user may then explicitly or implicitly signal to an application resident on the user-device 22 to begin the capture of information about/ associated with the composition.

A portion of the composition and/or information associated with the composition is captured by the user device 22 and then the "captured information and a user-ID" 2003, may be forwarded to the experience-provider 26.

The experience-provider 26 may establish a identify-mode request # for the user's account and then forward the "Request #, user-ID, and captured information" 2004 to an "identify-composition" processing capability 2100. The "identify-composition" function 2100 then analyzes the captured portion of the composition and/or the captured information about/associated with the composition; in-order to identify the composition. The "identify-composition" function 2100 then forwards the "Request #, user-ID and identified composition-ID(s)" 2005 to the experience-provider 26. The experience-provider may use a "Get Usage-Rights" 1406 in-order to check the Usage-Rights Repository 24 to see if the composition is already in the user's collection.

If the composition is not already in the user's collection, the experience-provider 26 may forward a "purchase order" 1403 in-order to request free usage-rights for a limited number of playbacks of the composition or composition-highlights from the composition-provider 23. The approval and transfer 1405 of free usage-rights (for the composition and/or composition-highlight) to the usage-rights repository 24 may occur as described elsewhere. The experience-provider 26 may then obtain (using messages 1404, 1406 and 1407) the free usage-rights for the identified composition and/or composition-highlight from the usage-rights repository 24 using methods discussed elsewhere. Once the experience-provider 26 has obtained the free usage-rights, the identified-composition may be marketed to the user by including the identified composition and/or composition-highlight in a custom sequence of compositions generated for the user. Methods for including a composition or highlight in a sequence (i.e., sequence generation) are described elsewhere. Using methods described elsewhere, the "composition/highlights along with corresponding reduced capacity tokens" 1413 may be delivered for use at any user-device 22 where the user is active.

Note that the "capture" of the composition may occur with one user-device while the later playback of the identified-composition and/or highlight of the identified-composition may occur on any of the user-devices where the user is active. That is, later playback may occur on a different user-device(s) from the one were the "capture" occurred.

The identified-composition and/or highlight may be presented a plurality of times to the user over a period of time. The use of the identified-composition in a sequence may adapt to user-feedback about the composition and/or highlight, as described elsewhere.

Note that the "identify-composition" function 2100 is not required to be a separate entity from the experience-provider 26, but in some embodiments the identify-composition function 2100 may be performed by the experience-provider 26. In some embodiments, the capture-device (e.g., user-device 22) may communicate directly to the external-processor (i.e., identify-composition function) 2100 rather than being transferred through an experience-provider 26.

In some embodiments, the "user" may refer to a single individual. In other embodiments, the "user" may refer to a group of individuals (e.g., a family) that may share ownership and usage of a library of compositions and/or usage-rights (e.g., group ownership account). Each individual may be uniquely identified when active at each user-device and then be mapped to their group ownership of compositions and usage-rights. An individual history for each member and a combined group history may be maintained.

Figure 2:
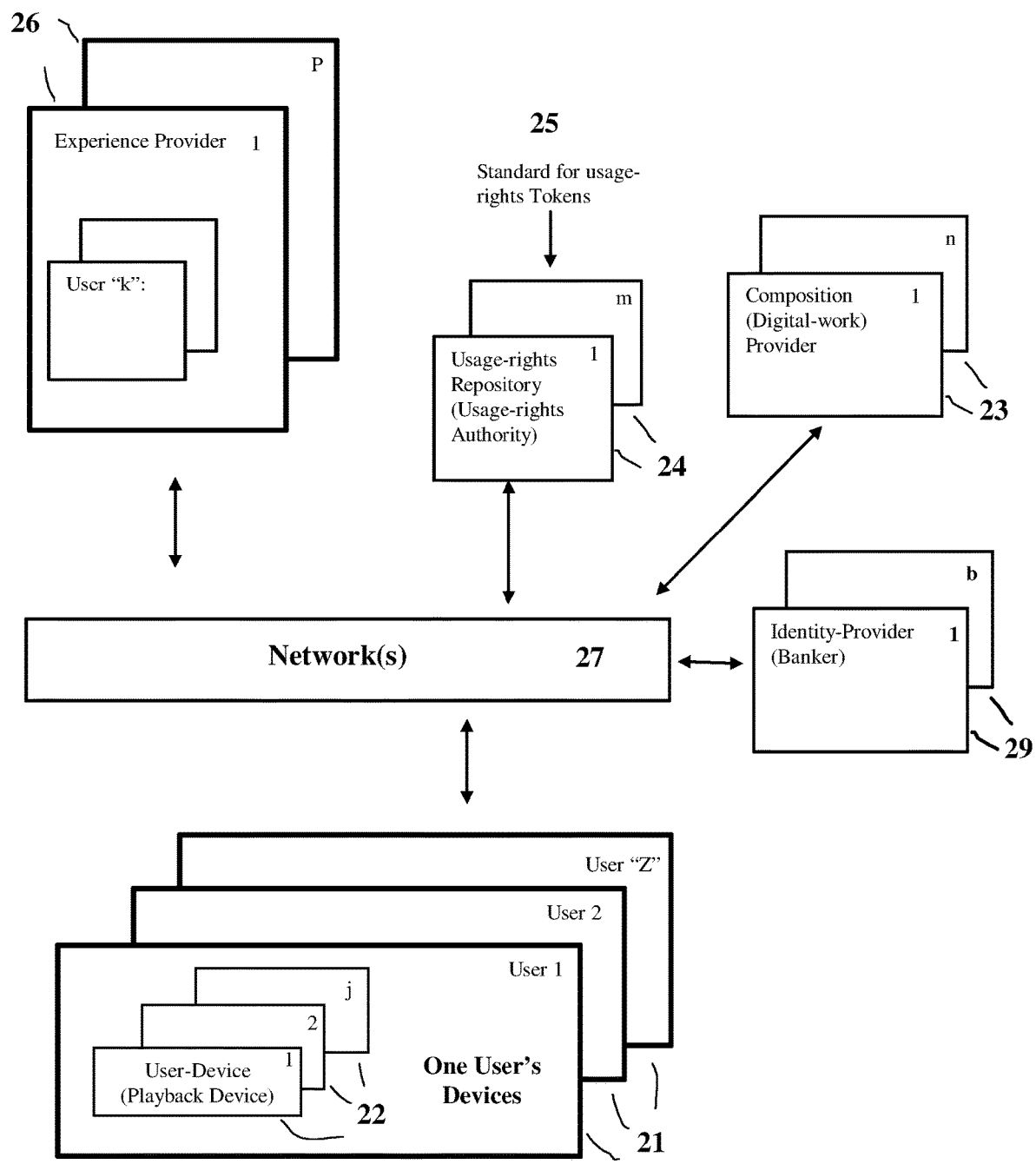
FIG. 2 illustrates the functional flow between user-devices, experience-providers and composition-providers and (optional) identity-providers.

Providing Compositions to User-devices:

FIG. 2 illustrates the functional flow between user-devices 21, composition-providers 23, experience-providers 26 and usage-rights repositories (usage-rights authorities) 24 across one or more networks 27.

As shown in FIG. 2, there may be a plurality of possible users 21 (user1, user2, . . . , user"z"). Each user may operate one or more user user-devices 22 at different times and different locations such as at home(s), work(s), automobile(s), portable(s), etc. A user-device 22 is capable of utilizing one or more types of digital-works. User-devices may also be incorporated into other products such as a cell phone, television or home entertainment system. The user-devices may be mobile and portable. Some user-devices (i.e., a personal player) may be used by only a single individual user. Other user-devices (i.e., an automobile player) may be operated by different individuals at different times. The user-devices may be manufactured by many different vendors. Any given user-device 22 may only be able to handle only certain types of digital-works and may only be able to handle a subset of the available composition formats.

There may be many composition-providers 23 that provide their own catalog of compositions for which they control the intellectual property rights. A composition-provider 23 may control the compositions for a single composition creation entity e.g., a creative artist(s) or group] or many composition creation entities.

There may also be many different experience-providers 26. An experience-provider 26 is responsible for providing the adaptive personalized entertainment sequence that is customized for each user and is integrated with the user's collection of compositions. The experience-provider 26 may automatically introduce the user to appropriate new compositions over time and automatically adopt the personalized program sequence as a user's tastes change. The experience-provider 26 automatically distributes the user's collection and also automatically collects and maintains the user's profile and history across all the user-devices. The user's collection is made available to any user-device 22 that the specific user is operating.

There may also be one or more usage-rights repositories (usage-rights authorities) 24. The usage-right repository utilizes a common "standard for usage-rights tokens" 25 so that a user's collection of compositions, represented by the set of usage-rights tokens a user acquires, may be recognized and usable with all experience-providers. Each usage-rights token may be defined to limit use to only a specific individual user or a group of specific users (e.g., a family). The tokens representing the compositions in a user's collection may be easily transferred between and used with any of the experience-providers. The usage-rights repository may maintain a database of all issued tokens so a user's collection (usage-rights tokens) may be preserved even if all the user-devices of a user were to be lost or damaged.

Most users will typically utilize many different players at different locations throughout the day and from day-to-day such as in different rooms of the home, at different homes, at different work locations, in different automobiles, or various portable user-devices. In addition, there are many user-devices that the user may only temporarily use, such as user-devices located at a hotel, a rental home, a rental car, on loan from a friend, etc. It is desired that the user's history and profile be interoperable and automatically synchronized between all these user-devices so the user history collected at each user-device is available to all other user-devices. An experience-provider 26 may automatically perform the required level of synchronization between all of the user-devices and storage locations on the network(s).

In one embodiment, the user history and user profile information is stored redundantly at multiple locations distributed across a network(s), such as the internet, so that the user's information has a high availability (even if some network nodes/paths are down) and is robustly protected from loss. Periodic back-up or archiving of the information may also be utilized to provide an additional protection against loss of the user's information. In one embodiment, this storage function is provided by the experience-provider. Alternatively, a separate storage provider may provide storage, backup, archiving and protection of the user's history and library on the network. In-order to protect user privacy, user information stored on the network may be stored in an encrypted form for which the storage provider does not hold the decryption keys. Encryption mechanisms may be utilized to keep a user's history private and not accessible to human prying.

In some embodiments, there may also be one or more identity-providers 29. An identity-provider 29 may be optionally used to provide an anonymous ownership of usage-rights so that the actual owner of a composition remains hidden and is protected against disclosure to others. In some embodiments, the identity-provider 29 may also perform banking functions in-order to maintain user anonymity and to protect the actual user's identity from disclosure to others.

Experience-Providers:

An experience-provider 26 is responsible for providing the adaptive personalized music (or entertainment) program that is customized for each user and is integrated with the user's collection of compositions. The experience-provider 26 may coordinate the following functions automatically without requiring any significant user action:

(1) Provide a sequence of compositions, highlights and other material that is customized for each user based upon the prior history of user control actions and feedback.

(2) Provide copies of compositions, highlights and other material to all user-devices as needed.

(3) Manage, store, backup and make available the user's collection so that it is available to all the user-devices. The user's collection may be represented by a set of user usage-rights tokens.

(4) Manage, store, backup and update the user's history (including control actions, feedback, play history, profile) across all of the user-devices in-order to adapt to the user's changing tastes.

(5) Recommend new compositions and highlights likely to be appealing to each specific user. Automatically incorporate the new compositions and highlights into the user's program sequence and the user's collection.

(6) Provide pre-customized channels for each user (representing different categories, genre or moods of music) that may then be further optimized for each user based on user control actions and feedback.

(7) Provide additional advertisements, news, or weather presentations in the user's program stream that may be customized for each user based on user control actions, feedback or user profile.

(8) Provide software updates for user-devices.

(9) Obtain usage-rights for compositions that may be made available to the user. Pay royalties to composition owners based on the user's usage.

(10) Bill users for composition purchases, usage and other services.

(11) Support an "identify-mode" in-order to capture, identify and provide an "interesting" composition that a user may encounter during their everyday activities.

Although all of the above functions may be performed by the user's experience-provider, they may be performed by separate entities or jointly with other entities. In one embodiment, the user may have many experience-providers to choose between and may be able to easily (instantaneously) switch, with low/no switching costs from one experience-provider 26 to another.

In one embodiment, the user's collection may be easily shared and utilized with all experience-providers 26 and all user-devices 22. This may be accomplished with user usage-rights tokens that may be issued by usage-right authorities 24 or composition-providers 23 that are universally recognized by all experience-providers 26. This eliminates problems with tokens issued by each experience-provider 26 but which are not recognized by other experience-providers and hence are not transferable and not interoperable.

All transfers of information between the experience-providers repository (or depository) and the user-devices may occur automatically without requiring any user knowledge or action. Concurrency of user data in the currently active user-device(s) 22 and the usage-rights repository 24 may occur automatically across the network 27 without the user needing to be aware of it or taking any action.

The experience-provider's costs for the library storage and management functions may be effectively amortized across a large number of users. The experience-provider 26 does not need to store an individual library of compositions for each user. The actual compositions may be stored in a common library that is shared by all users.

The amount of access bandwidth provided for each composition may be adjusted to match aggregate user demand. For example, a currently popular composition that is being downloaded by many users, may be made available from many servers across the network 27 in-order to meet the demand. While a less popular composition may be made available from significantly fewer servers on the network.

Prior to a user-device 22 shutting down, all the latest user feedback and user history may be forwarded to the usage-rights repository 25 for later use by other user-devices. The user-device's user display may optionally include an indicator that is activated during user-device 22 shutdown, to indicate whether concurrency with the repository has been completed. Optionally, the user-device 22 may include an automatic capability of periodically trying to establish a network 27 connection for upload in-order to complete concurrency with the repository prior to concluding shutdown.

In one preferred embodiment, user-devices may be able to operate with intermittent or temporarily unavailable network 27 connections. When a network connection is not available, the user-device 22 may utilize compositions and highlights that were previously transferred to the local storage in the user-device. New highlights and new compositions may be temporarily limited to what was locally stored during previous network connections. In addition, timely information such as news and weather may not be available when the network connection is lost.

News, weather, traffic, etc may also be customized for the user based upon factors such as the day of week, time of day, or the location of user. Customization of weather and traffic reports to the day of week and time of day. Reports may be automatically adapted to the current physical location of the user.

Since the entertainment-program is customized for each user, typically only one entertainment-program may need to be active at any one time. In some cases, the user may want the same entertainment-program to be available at multiple locations, such as in multiple rooms in a house. The experience-provider 26 may impose limitations on the number of simultaneously active user-devices and/or the maximum physical separation of user-devices that may be simultaneously active.

User-Device:

FIG. 3 is a functional diagram of a user-device 22 for generating an adaptable personalized entertainment experience. The user-device 22 includes a "user control interface" 32a for accepting user control actions. The user-device 22 may include one or more means for determining the individual user that is active at the user-device. The user-device 22 may include a "user display" 32b for presenting visual information for the current composition or user-device 22 status. The user-device 22 also includes "sound generation" capabilities 32c or an interface to an external sound generation apparatus so the user may hear the customized sequence of compositions and other program information. The user-device 22 includes storage 33 to hold information locally that may include: 1) Compositions. 2) New recommendations list(s). 3) New compositions and highlights. 4) Usage-rights (tokens). 5) Advertisements, news and/or weather. 6) User history 7) user-device software and updates. In one preferred embodiment, the storage 33 utilizes non-volatile memory so the contents may be maintained even when the user-device is un-powered.

The "network interface" 31 receives information 34 from the experience-provider 26 and sends information 35 to the experience-provider. Most transfers to and from the experience-provider 26 occur automatically without requiring the user to specifically initiate them. Information received 34 may include: 1) Favorite compositions. 2) New recommendations list(s). 3) New compositions and highlights. 4) Usage-rights tokens. 5) Ads, news and weather. 6) User history. 7) Software updates. 8) User feedback validation. Information sent 35 to the experience-provider 26 may include the user's history and updates to the user's history. User history and updates to user history may include: 1) User profile information. 2) User control actions. 3) User feedback. 4) User playback history. 5) User content restrictions.

The user-device 22 also includes a processor 30. The processor performs the user functions such as 1) Sequence Generation. 2) User control action (feedback) capture. 3) User history capture and update. 4) Experience-provider 26 interface transfers.

Identifying the Specific User:

Each user-device 22 may determine the specific user that is active at the user-device. Identification of the user at the user-device 22 allows 1) using the user's usage-rights at the user-device; 2) customization of the entertainment program for the individual user; and any other user specific capabilities.

Methods of identifying a specific user include:

Voice recognition or a unique verbal identifier or some combination of both may be used.

Visual recognition of the user's face or other features.

Gesture recognition the user.

Bio-metric sensing of the user such as a fingerprint sensor on the "on" control or other user-device controls. Iris scan.

User-ID/password, electronic-ID-cards or RFID tags.

Any other method of uniquely identifying a user.

Combinations of the above methods.

In one embodiment, each time the user-device 22 is re-started or powered-up the user may be re-determined so that multiple users may intermittently share the same user-device, yet experience a customized program. In one preferred embodiment, the user identification process may require minimal or no special user actions.

The user-device 22 may also keep a secured/encrypted record of the login-info of prior user-device users that were previously validated by the experience-provider. This enables a prior user to login and utilize a user-device 22 even when a network connection to the experience-provider 26 is (temporarily) unavailable.

In some cases, the identification process may be defaulted or biased toward the most recent user(s). For user-devices that are typically used by only a single user, the user identity may be configured on initial use and not reconfigured unless a reconfiguration is specifically requested by the user.

Accuracy in identification of the user is important to prevent corruption of the user's account, usage-rights and user history due to user identity errors, piracy or identity theft. Additionally, since the user's history and usage-rights are of considerable value to each user, user "identity theft" should be protected against. Methods for identity recovery may be employed, so a user's account and history may be restored to the state just prior to the occurrence of an identity theft. Software may be utilized by the experience-providers to monitor for unusual behaviors that may be indicative of identity theft.

It is desirable to create a user experience so that it is in the user's interest to correctly identify them selves to the "system" and to protect themselves against identity theft or the loaning of their identity to others. Users may realize that loaning their identity by others, may compromise their collection and corrupt their user feedback history and compromise their customized program experience. By protecting the user's collection and by providing a customized experience and continually introducing new compositions that may be of high value to the user, users may be naturally compelled to correctly identify themselves and avoid loaning their identity to others.

User Interface:

The user-device 22 (i.e., personalized player) may be controlled by the user via numerous types of user interfaces including voice activated, manual controls, touch screens, interactive displays, remote control devices, etc.

Figure 4:
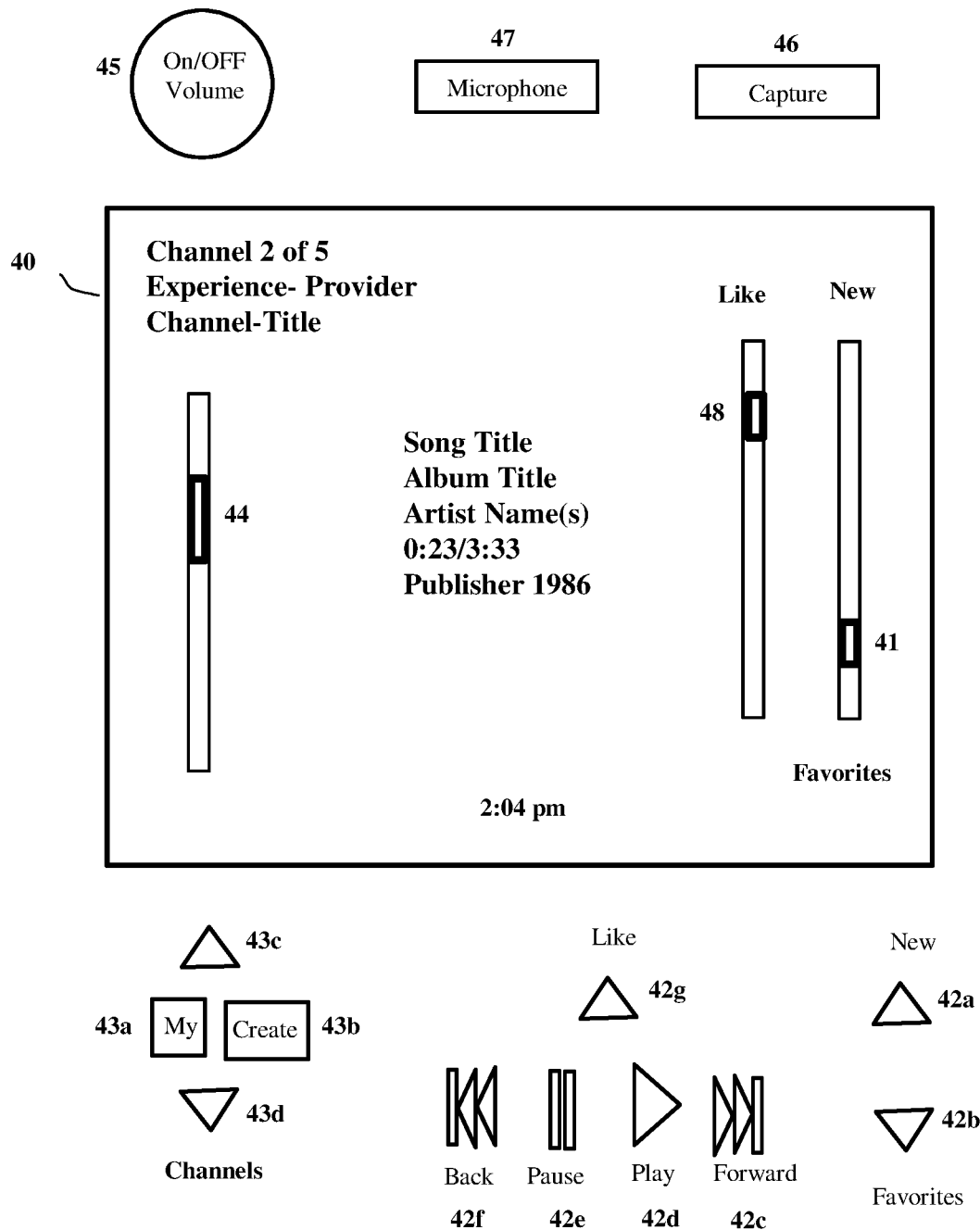
FIG. 4 illustrates an embodiment of a user interface for a user-device with manual controls.

FIG. 4 shows an example of a manual user interface for use where the user is within reach of the controls such as with a portable player, a remote control, or a user-device 22 located in an automobile within reach of the driver. Such controls may be implemented with electrical-mechanical controls such as push buttons, switches, sliders and knobs or with interactive touch screen control. In another embodiment, the controls of FIG. 4 may also be accomplished with voice commands.

The "Favorites-New" slider 41 is used to vary the percentage of new compositions that the user hears. When the slider is at the "favorites" position (lowermost position) all compositions may be selected among those most highly liked by the user. When the slider is positioned at the "new" position (uppermost position) the user is only exposed to new compositions he or she is not familiar with. The user may adjust the "Favorites-New" slider position by activating (pressing) the "New" 42a and "Favorites" 42b controls or in an alternative embodiment by dragging the slider indicator 41 upward or downward. As the slider 41 is positioned further away from "favorites" and closer to "new", the user may hear a greater percentage of new compositions and a lower percentage of favorites.

In another variation, highlights may be inserted at increasing frequency as the position of the "Favorites-New" slider is closer to the "new" position.

As shown in FIG. 4, the user-device 22 may include a display 40 to indicate information about the selected channel, composition being played (artist, title, etc), playtime, user-device status, etc. The user-device 22 may also include typical user controls such as "pause" 42e, "play" 42d, "forward" (or "skip") 42c, "back" 42f, and channel controls (43a, 43b, 43c and 43d).

In another optional enhancement, when a sequence of user commands indicate user difficulty or frustration, the user-device 22 may issue recommendations to the user on how to better utilize the user-device's capabilities. Such recommendations might be issued by voice synthesis or on the user-device display.

User Usage-Rights:

Rather than ownership of physical media, a user's collection may be defined by a set of tokens that define the usage-rights owned by one specific user or a specific set of users (e.g., a family).

In one embodiment, a token may represent a receipt of ownership or allowable usage. A usage-rights token may hold the usage-rights for a digital-work (e.g., a composition) or a group of digital-works (e.g., all the compositions on an artist's album).

The user's ownership of a collection of compositions is represented by a collection of usage-right tokens. Over time, a user may acquire or purchase various usage-rights to form their collection.

In some preferred embodiments, the token's rights may be may be easily distributed and usable at all of a user's user-devices. This allows the user's collection to be automatically available anywhere the user is located. In a preferred embodiment, the management and handling of the tokens occurs automatically without any user action to transfer them to user-devices. In one preferred embodiment, tokens may be utilized and validated with all experience-providers 26.

The usage-rights may extend for any period of time (start/stop time) or for the user's lifetime or perhaps perpetual rights that may be transferred to another user. The usage-rights may be limited to a certain number of plays or may be for an unlimited number of plays. The usage-rights may be limited to certain format(s) or may be valid for all formats available.

The usage-rights may also extend to future formats that may become available due to technology advancement. The usage-rights tokens may be upgradeable, when desired by the user, to expanded usage-rights.

Based on normal user control actions, new tokens may be automatically purchased or acquired on behalf of the user and added to the user's collection.

The usage-rights authorities 24 and/or composition-providers 23 may establish a "standard for usage-rights tokens" 25 so the usage-rights may used by all experience-providers and user-devices. In a preferred embodiment, usage-rights (tokens) may be recognized and usable with all experience-providers 26 and user-devices so users may easily switch between experience-providers 26. The usage-rights tokens may be issued by usage-rights authorities 24 or composition-providers 23 that are independent of but recognized by all experience-providers. In some embodiments, a composition and corresponding usage-rights provided to a user-device by one experience-provider; may be utilized at the user-device by any other (authorized) experience-provider.

The usage-rights authority 24 or composition-providers 23 may obtain issuing rights from the intellectual property owners of each composition.

The token ownership may also be optionally transferable to another user so a user may transfer a portion (or all) of their collection to another individual (e.g., upon the owner's death). In some embodiments, a nominal fee may be charged to transfer a token or a set of tokens to another ownership. To control piracy from extremely short-term exchanges, a limitation on the minimum time between such transfers may be imposed.

In some embodiments, a copy of a token may be issued to users in a physical hardcopy form or in an electronic form. For example, a receipt representing a token ownership may be issued at the time of purchase. For privacy and security reasons, the format and contents of a usage-rights token issued to the owner may be different from tokens maintained on the network. In one embodiment, a token issued to an owner may be validate-able and convertible into an electronic token that may be used on the network. In some embodiments, issuing tokens to users may not be preferred, because the user becomes involved with the storage and management of such owner issued tokens and they are redundant to the tokens automatically maintained by the usage-rights repository 24.

In one embodiment, users may be allowed to exchange their previously purchased physical media such as a CD for usage-rights token(s).

In one embodiment, previously used proprietary usage-rights (e.g., Apple iTunes) may be converted (perhaps for a conversion fee) into generalized usage-rights that may be usable with all vendors user-devices. The proprietary usage-rights may be then revoked or disabled in the proprietary user-device(s) via the revoke capabilities typically included within each vendor's proprietary DRM approach. The converted generalized usage-rights may then be added to the usage-rights repository so they may be used for user-devices from all vendors and with all experience-providers.

Usage-Rights Representations:

The token may represent the user's ownership and/or usage-rights of any type of digital-work including music, music videos, multi-media, artwork, pictures, images, audio, sound, short films, movies, video clips, television programs, audio versions of books, a visual book, talks, speeches, voice content, lectures, software program, software plug-ins and any other type of digital-work.

In one preferred embodiment, the token usage-rights may be defined to be valid for all available (network interface-able) user-devices and their corresponding formats. This is a major convenience for user's since they no longer need to be concerned with the details of user-device formats, format translations and compatibility problems. The user is guaranteed that their token may be good for use with all their user-devices.

In other embodiments, the token usage-rights may only be valid for a specified subset of user-devices and their corresponding formats (e.g., only Apple device formats). In other embodiments, tokens usage-rights that are limited to only certain user-devices may be extensible so that they may be upgraded, possibly for a small fee, to be compatible with a wider set of user-devices or all user-devices.

For music, the token may represent usage-rights for only a specific version of a song by a specific artist (for example, the original studio recording). In one embodiment, the token may be valid for all available digital formats (e.g., CD-format, MP3-format, etc), including different formats required by different user-devices and different quality formats. For example, the token may be valid for a cell-phone format that may have an inherently lower bandwidth/quality, a MP3 format and for an ultra quality user-device (such as Super Audio CD format) requiring greater storage and bandwidth (as well as all intermediate quality formats).

Composition-Providers may decide to issue free tokens that allow a limited use of a composition (e.g., limited number of playbacks or use-time) in-order to interest a user in ultimately purchasing the composition. The offer of a free token may be based on indicators of customer reputation such as the user's (anonymous) credit rating, the quantity of prior user purchases and the user's payment history. Experience-providers, using projected estimates of a user's interest, may request such free tokens for specific compositions from a composition-provider 23 on a user's behalf.

Tokens may also be used to represent usage-rights for composition highlights, for example a shorter version of the composition that contains especially compelling portions of a composition. There may be multiple highlight versions of different quality and format. A composition-provider 23 may issue a token that allows a certain number of free plays of a composition highlight, in-order to generate user interest in eventually purchasing of usage-rights for the composition at some later time.

In the case of a book, the usage-rights may allow the book text and images to be by viewed on any user-device. For example, the data format for a mobile phone may be different from that for a PC or a tablet book-reading user-device. Their usage-right token may be valid for use on a mobile phone, a specialized book reader, a personal computer and any other user-devices. The experience-provider 26 may automatically deliver the appropriate format to whatever user-device 22 the user currently wants to view the book with. For a book, the free token may be limited to a certain amount of time or limited to only certain portions of the book in-order to allow a user to preview the book before deciding whether to purchase it.

Contents of a Usage-Rights Token:

The tokens may be defined so that they may be easily transferred across the network and shared by multiple experience-providers or other providers. An individual token may be defined as a separate entity such as an object or data structure or file. Each token's contents may also be stored as a record in a database.

Figure 13:
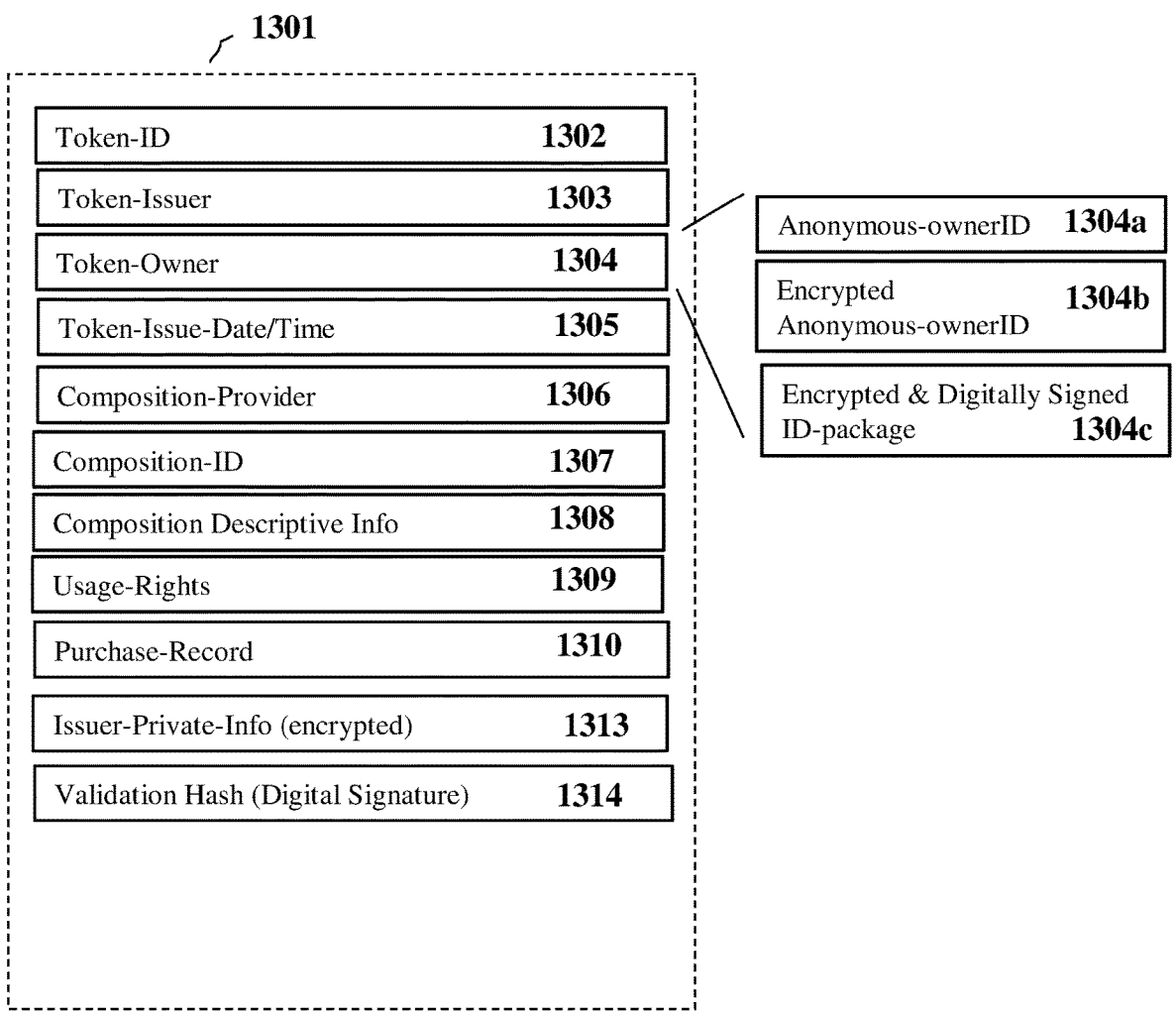
FIG. 13 illustrates an example of the contents of a usage-rights token (ownership token).

FIG. 13 illustrates one detailed embodiment of the contents of a usage-rights definition 1301 (i.e., usage-rights token or ownership token).

The owner of the token may be defined by a token-owner 1304 definition in the token 1301. Each token 1301 may be defined for exclusive use by a specific user (e.g., an individual) or a set of specific users (e.g., a family).

The token-owner 1304 may indicate the actual identity of the owner or may refer to the owner in a unique but anonymous manner.

In one preferred embodiment, the token contents may be defined to maintain ownership confidentiality and privacy, so the actual owner's identity may be not be determined by either:

(1) inspection of the token 1301 by itself or
(2) the experience-providers (and other providers) by using the token 1301 in combination with other information the experience-providers may have.

In one embodiment, the ownership of the token may be defined by an anonymous-ownerID 1304a from which the actual user may not be directly determined. An identity-provider 29 (e.g., banker) may maintain a confidential mapping between the anonymous-ownerID and the actual owner's identity. In-order to maintain user privacy and identity, the other providers may be prevented from accessing this mapping and the identity-provider 29 may be prevented from accessing the tokens and usage-rights repository 24.

In one preferred embodiment, the ownership of the token may be defined by an encrypted-anonymous-ownerID 1304*b*. Public key encryption (e.g., a private-public key pair) may be used so that the identity-provider 29 encrypts the anonymous-ownerID with a private key. The authorized providers may validate (but not decrypt) the encrypted-anonymous-ownerID by using the public key. Digital signatures may also be used. The actual owner's identity may not be determined from either the anonymous-ownerID or the encrypted-anonymous-ownerID.

In one preferred embodiment, the ownership of the token may be hidden within an encrypted and digitally signed package 1304*c* that may only be decrypted by the identity-provider. Public key encryption (e.g., public-private key pair) may be used where the token issuer encrypts the anonymous-ownerID with a private key and the encrypted username may be validated (but not decrypted) by other authorized providers by using the public key. Or a combination of encryption and digital signatures may be used.

In addition, the identity-provider 29 may maintain a secure private database 1506 that maps the Login-Info to: the anonymous-ownerID 1304*a*; and/or encrypted-anonymous-ownerID 1304*b*; and/or the encrypted and digitally signed package 1304*c*. The identity-provider 29 may maintain another secure private database 1504 that maps the anonymous-ownerID and is not accessible by any other providers.

The anonymous-ownerID 1304 may include a reference to the identity-provider 29 that issued the anonymous-ownerID. The token may also include a link; hyperlink; pointer; or universal resource locator (URL) to a network 27 location where the identity-provider 29 may validate the existence of the anonymous-ownerID and the status of its associated account.

The token-owner 1304 may also be defined using a combination of the above methods and/or other user identification methods known by those skilled in the art.

Each token issued may have a unique token-ID 1302.

Each token may also include the token-issuer 1303. The token-issuer 1303 information may include a link; hyperlink; pointer; or universal resource locator (URL) to a network location where the token may be validated by the token issuer.

Each token may also include the issue-date/time 1305 and composition-provider information 1306. Each token may also define a composition-ID 1307. Each version of a composition may have a unique composition-ID 1307 assigned to it. For example, the studio and each different concert version of the same song by the same artist may have a different composition-ID.

The token 1301 may also include composition description information 1308 such as the composition-name, artist, artist version, composition release and performance dates, etc.

The token 1301 may also include the definition of the owner's usage-rights 1309 (ownership-rights) such as the TimePeriod Valid; Number of Plays Allowed; fee per play; an unlimited plays until date; end-date; number of copies allowed; allowed type of user-devices; execution-rights; etc.

In one preferred embodiment, tokens may authorize playback with all existing formats and all (networked) user-devices. Sales of usage-rights may increase when users are more confident of the compatibility and the future usability of their purchased compositions.

In one embodiment, tokens may authorize playback of the composition with future formats and future user-devices, perhaps with a small one-time additional fee. This may eliminate user concerns that their purchases of usage-rights may be worthless if the technology evolves or changes in the future.

The token may also so include a token purchase record 1310. The user's purchase record may include information such as Date & Time token Purchased; Purchase Order ID; whether upgraded from a prior token-ID(s); Amount Paid; Cumulative Amount Paid; Form of Payment; etc.

The token may also include an encrypted information area 1313 where the token-issuer may encrypt and digitally sign private information that the token-issuer alone may use to validate the token as being valid and uncompromised. Multiple levels/schemes of encrypted, hidden, coded information may be used to maintain token integrity even if some levels or schemes become compromised. The token issuer may also maintain a separate secure and private database of issued tokens that may be used to validate tokens.

One or more digital signatures 1314 may be used to allow detection of unauthorized changes to a token or sub-sections of a token. The signature may be derived from a hash function such that the value of the signature is related to all the signed data and the alteration of any signed data may result in a different signature value. Public-Private key signatures [e.g., public key encryption (PKI) methods] may be used. The signature may be generated with a private key that only the token creator knows. Any experience-provider 26 or other authorized provider (or user-device) may then use the corresponding public key to validate that the token has not been altered since it was issued.

The contents & structure of the token may be defined by an industry standard or standards defined by the experience-providers and/or composition-providers. Portions of the token may be defined using a mark-up language such as the Extensible Markup Language (XML) with a schema definition that defines each element.

In some embodiments, the token may be formatted, reformatted, repackaged, encrypted and digitally signed in different ways depending on where and how the token is being used on the network. For example, in one embodiment a token in the usage-rights repository may be stored as a record in a (relational) database. The format and/or contents of the usage-rights tokens stored in the usage-rights repository may differ from the reduced-capacity-tokens that are distributed to a user-device. Also in some cases, the format of certain reduced-capacity-tokens may need to be compatible with the digital rights management scheme that is proprietary to a user-device.

There are many alternative implementations that are functionally equivalent. Many alternative embodiments are possible within the scope of the invention.

Figure 12:
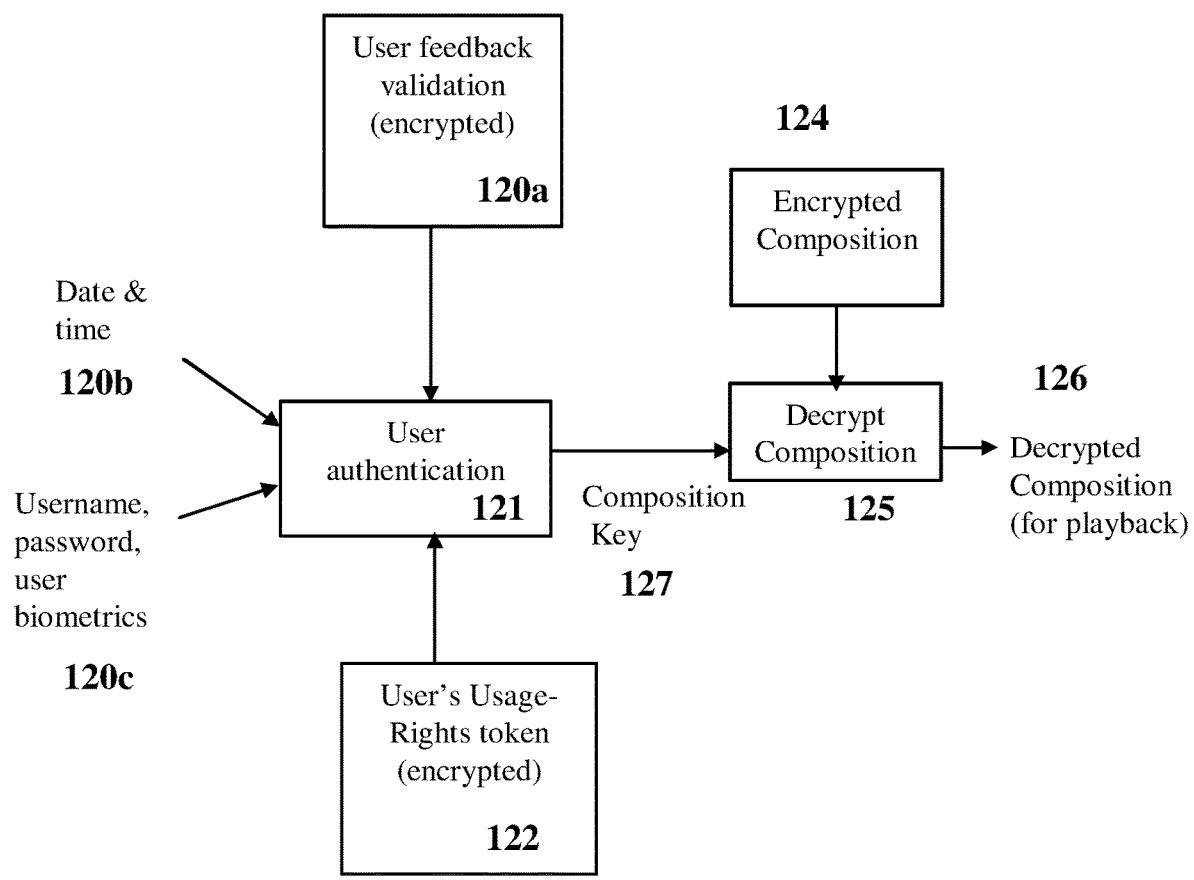
FIG. 12 is functional diagram of an embodiment of the user usage-rights management at a user-device.

Using Tokens to Utilize a Composition at a User-Device:

The usage-rights token may be separate from the composition. As shown in FIG. 12, the compositions may be delivered and stored in an encrypted form 124 at the user-device 22. The usage-rights token 122 along with user ID/password/biometric information 120*c*, date/time 120*b* and "user feedback validation" information 120*a* may be used by the user-device 22 to decrypt the composition key. The composition key 127 may then be used by the user-device 22 to decrypt the composition 125 to generate the decrypted composition 126 for playback to the user. In some embodiments, reduced-capacity usage-rights tokens rather than the full usage-rights may be delivered to user-devices 22.

The "user feedback validation" 120a may be encrypted and represent a validation that the user has provided regular and consistent usage and history feedback to the experience-provider(s). If appropriate user feedback is not received from a user-device, the "user feedback validation" 120a may lockout usage of that user-device until such expected feedback is re-established. The "user feedback validation" 120a may also include (a secured) date and time information to protect against improper settings of the local clock by a user in-order to circumvent a token expiration date. The "feedback validation" 120a may also be used to inhibit user ID piracy or inhibit multiple users from using a single user's login-info (e.g., login-ID) by preventing an excessive number of user-devices from being simultaneously operated in widely different physical locations.

Capturing and Utilizing User Control Actions:

The user's control actions (control history) from a user's various user-devices may be captured as user feedback about the compositions heard by the user. The user control history (feedback history) may then be utilized as input for the ranking of compositions by likeability and for the creation of a customized composition sequence (or entertainment program) for each individual user.

User feedback about each composition when it is playing may be obtained based on the user's usage of the "back" 42f and "forward" 42c ("skip") controls (or the equivalent voice controls). For example, a user's composition rating may be increased, whenever the user uses the "back" 42f control (or a series of "back" controls) to request that a recently played composition be repeated. For example, if the user uses the "back" control to immediately request that the currently playing composition be repeated, the user rating for that composition is significantly increased. Similarly, if the user uses a series of "back" controls to request that a recently played composition be replayed, then the user rating of the requested composition is significantly increased. If the user requests that a composition be played after searching for the composition in the user's favorites list, the user rating for that composition may be increased. If the user requests that a specific composition be played, the user rating for that composition may be increased.

Similarly, a user's composition rating is decreased, whenever the user uses the "forward" control 42c to request that the rest of a currently playing composition is to be skipped. The amount the user's composition rating is decreased may be dependent on how much of the composition has played before the user activates (presses) the "forward" control. For example, the rating may be decreased a smaller amount if the user skips forward near the end of a composition playback. The rating may be decreased a larger amount if the user skips "forward" near the beginning of the composition playback.

A user's composition rating may be changed by the "forward" or "back" controls, only when the composition has played for a long enough time for the user to recognize it (i.e., the playback time has exceeded a recognition threshold time). For example, if the user hits the "back" or "forward" control so quickly in a sequence that there is not enough time for the intermediate compositions to start playing and be heard by the user, then the ratings of the intermediately bypassed compositions may not be affected.

An additional method for indicating positive user feedback may be accomplished by a single action by the user, such as activating a single control (if manually controlled) or the speaking a single word (if voice controlled). For a user-device 22 (e.g., player) with manual controls such as in FIG. 4, a single control switch called "Like" 42g (or another suitable name) may be pressed by the user while a composition is playing in-order to indicate a desire that the composition be played more frequently. Optionally, different amounts of "like" may be indicated by the number of times the user activates (presses) the "Like" control 42g while the composition is playing. For example, if the user activates (presses) the "Like" control multiple times while a composition is playing, the user rating for that composition (and the frequency that the composition is played) would be significantly increased. Alternatively, the "Play" control 42d may be used (instead of the separate "Like" control) to indicate a user desire for the currently playing composition to be played more frequently. The user may activate the "Play" control one or more times to indicate a desire to hear the currently playing composition more frequently. The variation/distribution in the number of multiple "Like" pushes typical for a given user may be used to calibrate the appropriate adjustment of the user's composition rating versus number of "Like" pushes. Such calibrations may be adjusted over time so that the rating change associated with each different number of "Like" pushes, may adapt to each user over time.

Similarly, a compositions rating may be increased when a composition "highlight" segment is playing and the user hits the "Play" control 42d, in-order to immediately hear the full composition.

Although, a "dislike" control (or voice command) may be similarly utilized to indicate a negative feedback, it may not be needed since use of the "forward" (skip) control while a composition is playing, is itself a sufficient indicator of "dislike".

Figure 7A:
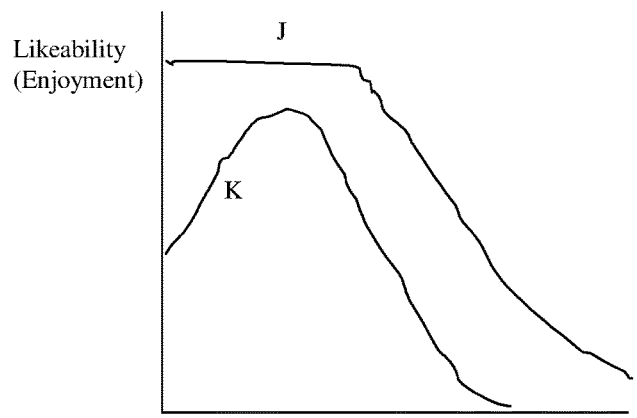
FIG. 7*a* illustrates typical graphs of "user likeability or enjoyment" versus the "number of times heard".

Even if the user does not provide any feedback on a composition during a playback, the user's rating may be automatically adjusted lower (or higher) based on an estimated change in likeability as a function of the number of times heard by the user. FIG. 7a show examples of likeability of a composition as a function of "number of times heard". The data illustrated by these curves may be generated based upon the aggregate feedback to the composition from other users considered similar to the user. Curve J in FIG. 7a, is an example of a high initial likeability for many playbacks followed by an eventual decline in likeability. Curve K in FIG. 7a, is an example of medium high initial likeability followed by an initial increase in likeability with times played, then followed by an eventual decline in likeability from the peak likeability. Although curves are shown for illustration purposes, the actual embodiment, may utilize look-up tables, databases, functions, equations, etc.

If the user has had a lot of recent forwards (skips) over prior favorite compositions, the favorites-new setting 41 may be automatically adjusted more towards the "new" mode so that the user is exposed to a larger number of new compositions. In this case, the favorites-new indicator (41 in FIG. 4) may be automatically adjusted to be closer to the "new" position.

By utilizing the normal user control actions as feedback on each currently playing composition, the users rating automatically adapts to the user's evolving preferences and tastes over time without requiring special actions by the user to specifically rate compositions. A user's composition rating may be re-adjusted each time a composition is played or selected, so the rating adapts gradually and automatically. User feedback on each composition while it is playing occurs automatically based on the user's normal control actions.

The user does not need to know the artist, title or anything else about the composition; only whether he or she likes what is currently playing. The user does not need to take special action to rate compositions on a rating scale. The user also does not need to be aware of a rating number system (e.g., 1 to 100) or adjusting the relative number rating of one composition versus another and to manually re-adjust such ratings as the user's tastes change over time. The user is not required to navigate a set of windows or menus to rate the composition. The user is not required to manually select from a catalog of compositions in-order to create composition playlist(s).

Figure 1:
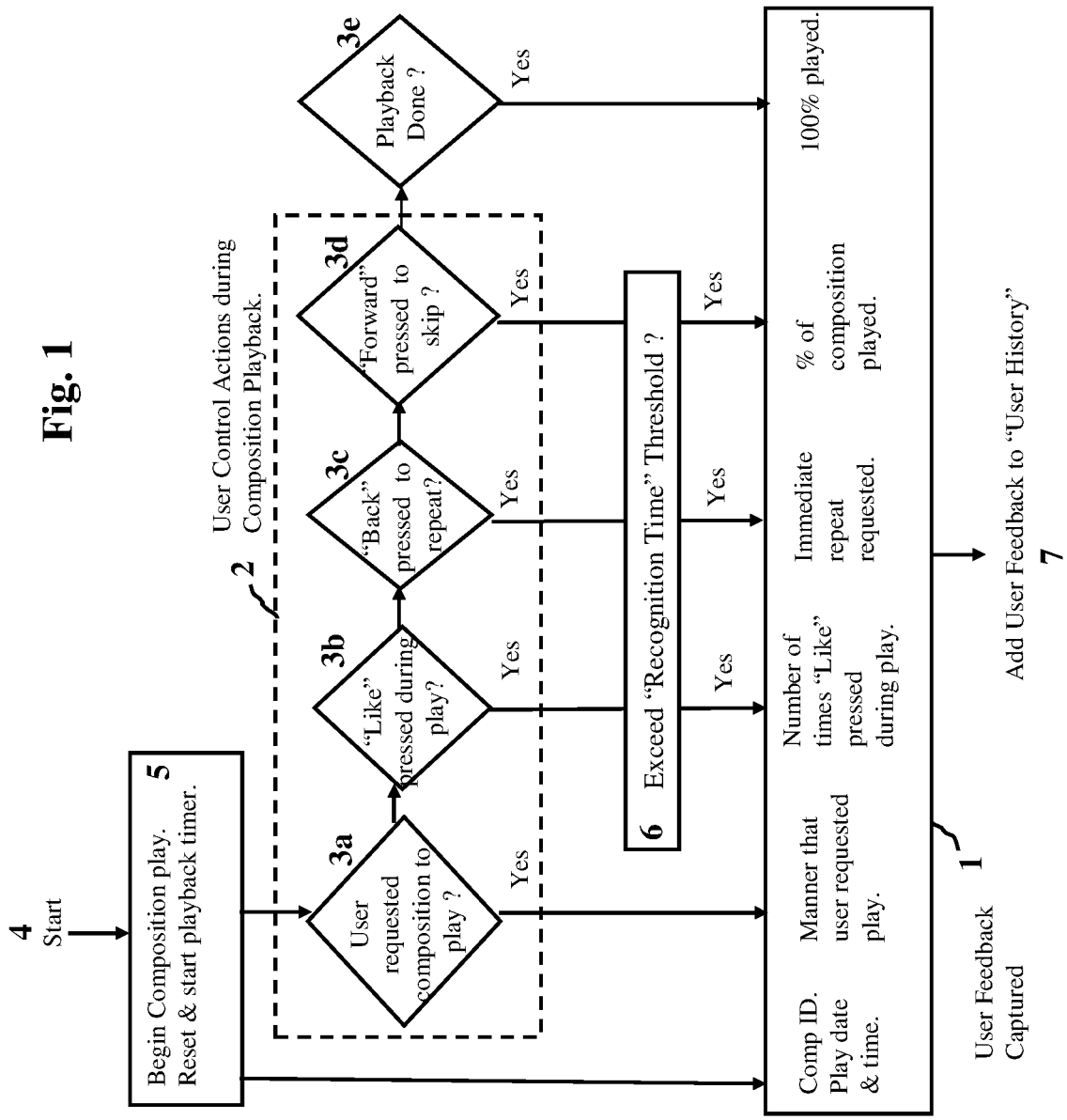
FIG. 1 illustrates the capture of user control actions representing user feedback about a currently playing composition.

FIG. 1 illustrates the capture of user control actions representing user feedback about a currently playing composition. "Start" 4 occurs with the "Begin composition Play" and the "Reset and start of the playback timer" 7. The playback timer records how long each composition has been playing. When the user control action (while the composition is playing) is a "Forward" pressed to skip" 3d (i.e., stop currently playing composition and go to next one), the timer may be used to determine the percentage of the composition that was played, which may be representative of the amount of user dislike for the composition (a negative feedback). Typically, the lower the percentage that a composition was played through, the greater the user dislike for the composition. When the user control action is a "Back" pressed to repeat" 3c (while the composition is playing or has just finished), an "Immediate repeat request" (a positive feedback) is generated for the composition. When the user control action is a "Like" pressed during play" 3b, the number of times the "Like" was pressed during composition playback (a positive feedback) is captured for the composition. If the user took specific action(s) to play the composition, such as "User requested composition to play" 3a (a positive feedback), the manner that the user requested play is captured. For example, the user may have searched his favorites to request that the specific composition be played. When a complete playback has occurred 3e, a "100% played" is captured as user feedback.

Note that the composition playback may be required to have played for at least a "Recognition Time" threshold 6 before certain user control actions are captured. The "Recognition Time" threshold represents the minimum amount of time that a composition must played in-order for a user to hear it and form an opinion. The threshold may be used to filter out user control actions that occur too soon after a composition starts playing, to be true feedback about the composition. When a composition playback begins, the composition ID, date and time may also be captured. Note that there are many "user control actions during composition playback" 2 that may generate "User Feedback" 1. The "User Feedback" 1 is then "added to the User History" 7.

Generating a Sequence of Compositions:

FIG. 6 is a functional diagram of a real-time sequence generator 60. The sequence generator operates in real-time in-order to immediately respond to user control actions 61 such as "forward", "back", "pause", "play" and "new/favorites". The sequence generator is able to automatically transition between immediately responding to user control actions and automatically generating a customized sequence of compositions (entertainment program) for the user.

The sequence generator may automatically enter the customized program mode whenever all prior user control requests have been completed and the user is not currently providing control actions to affect the composition sequence.

When in the customized program mode, a primary determinate for the "ID of the next composition to be played" 67 may be the position (setting) of the "Favorites-New" control 41. When in the favorites position, compositions may be chosen based on the likeability ratings of compositions based in the "user's history" 64. If the user's list of favorites is short, then it may be necessary that new (to the user) compositions and highlights may be interspersed with the user's favorites to provide sufficient composition variety and to allow automatic expansion of the user's list of favorites (or collection).

A customized ordering of "favorite" compositions may be determined in advance so that the compositions and associated usage-rights may be provided across the network 27 to the user-device prior to being needed. A second customized ordering of "new" compositions and highlights may also be determined in advance so that the compositions and associated usage-rights may be provided across the network 27 to the user-device prior to being needed. The customized sequence may be generated by interspersing compositions from the favorites ordering and new ordering. The relative number of compositions selected from the two orderings may be adjusted based on the "new/favorites" control 41. The two customized orderings may be generated in the user-device 22 or by the experience-provider 26.

Figure 7B:
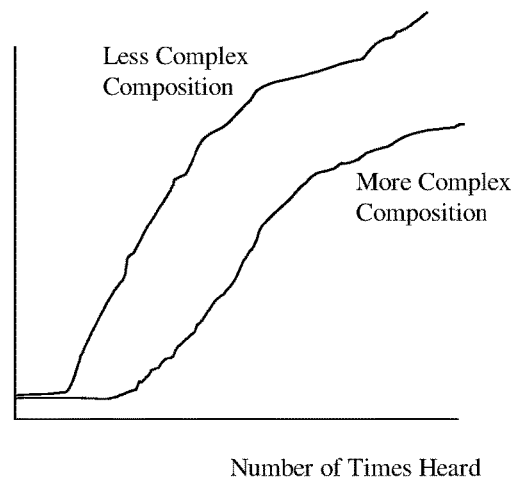
FIG. 7*b* illustrates typical graphs of "time between plays" versus the "number of times heard".

The time between playbacks of a composition may be determined as a function of the "number of times heard". FIG. 7b shows example curves of "time between plays" versus "number of times heard" and the psychological "complexity of the composition". When a composition is new to the user (and the user has indicated positive feedback) the time between plays is shorter. Eventually, as user likeability decreases with familiarity, the time between plays is increased. The user may tire of compositions with a lower psychological "complexity" more quickly than those with a greater psychological "complexity". The likeability functions may be constructed based on aggregate user feedback of users that are considered similar to the user.

Figure 7C:
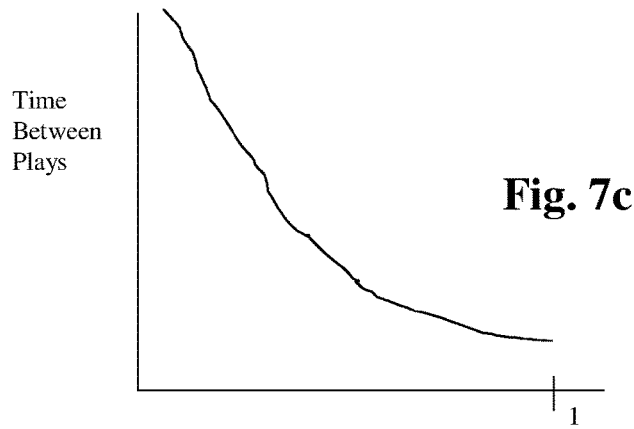
FIG. 7*c* illustrates a typical graph of "time between plays" versus "(current enjoyment)/(peak enjoyment)".

Alternatively, the "time between plays" may be determined or influenced by the ratio of "current likeability divided by peak likeability". As the example in FIG. 7c shows, the "time between plays" may increase as the "current likeability" decreases relative to "peak likeability". A re-schedule queue 65 may be used to hold the user's favorites ordered by their next playback time.

It may also be useful to define different types of "time between plays". First, there may be a "no more than X time between plays" for new compositions that the user has indicated significant positive feedback and hence wishes to hear frequently. Second, there may be an "at least X time or greater between plays" for older favorites that the user still likes somewhat but no longer wants to hear as often.

Although curves are showed in FIGS. 7a, 7b and 7c for illustration purposes, actual implementations may utilize methods such as lookup tables or equations/functions where the coefficients/parameters may be determined by fitting to the data within an acceptable error.

An ordered list of the locally available new compositions 62 and an ordered list of the locally available highlights 63 may be used to determine the order they are presented to the user or interspersed with the user's favorites. When the sequence generator has decided to playback a new composition or highlight, the next one on these lists is played. The selection of the compositions on these lists and their order on these lists may be determined as described in the section entitled "Selection of New Compositions and Highlights". Only compositions for which the user has usage-rights and that are immediately available locally are included on this list. Some composition-providers may allow a certain number of free plays for a user in the hopes that the composition may become a user favorite and be purchased and added to the user's collection.

The sequence generator 60 maintains a record of the "user history" 64 locally which is updated with all the user's control actions and the history of composition playback. When scheduled and when network connectivity is available, the sequence generator 60 provides "user history updates" 66 back to the experience-provider. The update may only include new [and may exclude previously forwarded] user history information.

An example of the "user history" 64 data elements is shown in FIG. 5. Shown at the top of each column in FIG. 5, are parameters that may be captured for each composition the user has heard. The parameters maintained for each composition may include the following: 1) A unique "composition number (Comp #) used to identify each composition. 2) The user's usage-rights token for each composition. 3) Whether the composition is available locally. 4) The user's current enjoyment rating. 5) The user's peak enjoyment rating. 6) The number of times the composition was heard. 7) The play history including the date/time when the composition was last heard. 8) The target time between playbacks. 9) The user feedback history representing the positive and negative user control actions related to the composition. 10) The likeability curves, equations or functions that apply to the composition which may be identified by a pointer, filename or other identifier.

In one preferred embodiment, the sequence generator 60 may be implemented as a plug-in software module, so that continually improved versions may be created by the experience-providers or sequence generator providers.

Using "Highlight" Segments to Introduce New Compositions:

Including highlights (i.e., composition samples) in the customized entertainment sequence is an optional enhancement of the invention. It allows the user to more quickly discover pleasing compositions that may be "new" to the user. "New" to the user means compositions that the user has not yet heard or is not yet sufficiently familiar with. This would include compositions that have been available for many years but the specific user has not yet experienced. It also includes those compositions that have been recently released but the specific user a limited familiarity with. A composition may be "new" to the user even though was released years or decades ago. Highlights may be interspersed with full compositions in the customized entertainment sequence. New highlights may be custom selected for each user based upon the probable likeability (enjoyment) as estimated from the user's history and profile.

Each highlight (i.e., highlight snippet/segment or composition sample) is an approximately 10 to 20 second cut (sound segment) of a highly compelling part (or parts) of a composition. The most compelling part(s) of a composition may be manually pre-selected by an artist, expert, focus groups or based on aggregate user feedback. Assuming an average composition-duration of a little over 3 minutes, the use of highlights may increase the user's discovery of new music by a factor of about 10 to 20 times. The highlight (sound segment) may utilize a storage format similar to any other composition (only they are of shorter length). A highlight may be free for a limited or unlimited number of plays by a user. The user-device may include an audio or visual indicator to aid the user in distinguishing between a highlight and a full composition.

Highlights may be interspersed with user favorites and new compositions based upon the "favorites-new" control (slider) 41 setting. Highlights may be interspersed more frequently; the closer the "favorites-new" control 41 is to the "new" position.

In one variation of the invention, when the slider 41 is in an extreme newness position (uppermost position), the user-device 22 may enter the highlights-mode where the user may hear a sequence of composition highlights so that the user is exposed to a larger number of compositions in a shorter period of time. The highlights-mode allows each user to discover new pleasing music and to expand their collection of compositions at a higher rate.

Typical user control actions may be captured as user history (feedback) while each highlight is being played. This may include skipping ("Forward") when the user dislikes the highlight (indicating negative feedback) or jumping backward ("Back") if the user wishes to hear the highlight again (indicating positive feedback) or activating (pressing) the "like" control (indicating positive feedback). While the highlight is playing, the user may activate (press) the "Play" control to immediately hear the full composition (also indicating positive feedback). After the full composition has finished (and the user has not provided other control actions), the "highlights" mode may resume playing other highlights.

When the user indicates sufficient positive feedback, while a highlight is playing, the composition may be added to the user's list of favorites or potential favorites. When the user indicates sufficient negative feedback while a highlight is playing (such as forwarding past it), that highlight (and "similar type" highlights) may be less likely to be presented to the user. If the user does not provide any feedback or a weak feedback, while a highlight is playing, that highlight may be presented to the user for re-consideration (and user feedback) at a later time.

Since the user might activate a control in error, the user ratings of a composition should not be excessively affected by a single user control action. Rather the user ratings for a composition may be gradually changed based upon feedback from multiple exposures to the composition over a period of time. For example, it may take several playbacks of a composition over a extensive period of time, in which a "Forward" (skip) was consistently activated early during the composition playback (and there was no other positive feedback), in-order for the user's rating of that composition to become so negative that it would not be presented to the user again.

When the user's list of favorites is too small to generate a sequence with an acceptable time between replays of the user's favorites, the sequence generator may intersperse more new compositions and/or highlights between the user favorites. In this manner, a user's list or collection of favorites may be naturally expanded, when required, without requiring any special user actions to search for and locate the new compositions.

When the sequence generator is in the favorites mode and the user appears to be disliking and forwarding over much of the music, the user-device 22 may recommend that the user move toward the "new" position on the "Favorites-New" slider 41. Alternatively, the slider 41 may be automatically moved toward the new position so the user may be exposed to more new compositions that are likely to be pleasing to the user. In addition, an increased number of new highlights may be automatically interspersed by the sequence generator.

The user-device 22 may include a mechanism for the user to approve the acquisition or purchase of a new composition(s) or the usage-rights for a new composition(s).

For example, the user-device display may display information about the new composition such as its purchase price and purchase terms while the composition or its highlight is playing. Or such information may be communicated to the user by audio prior to or following the playback of the composition or highlight. A sale or bargain price may be offered to the user. To confirm a purchase, the user may take control action such as activating a certain control or perhaps speaking a certain word or phrase. Of course, some purchase plans may not require approval of each purchase.

Figure 8:
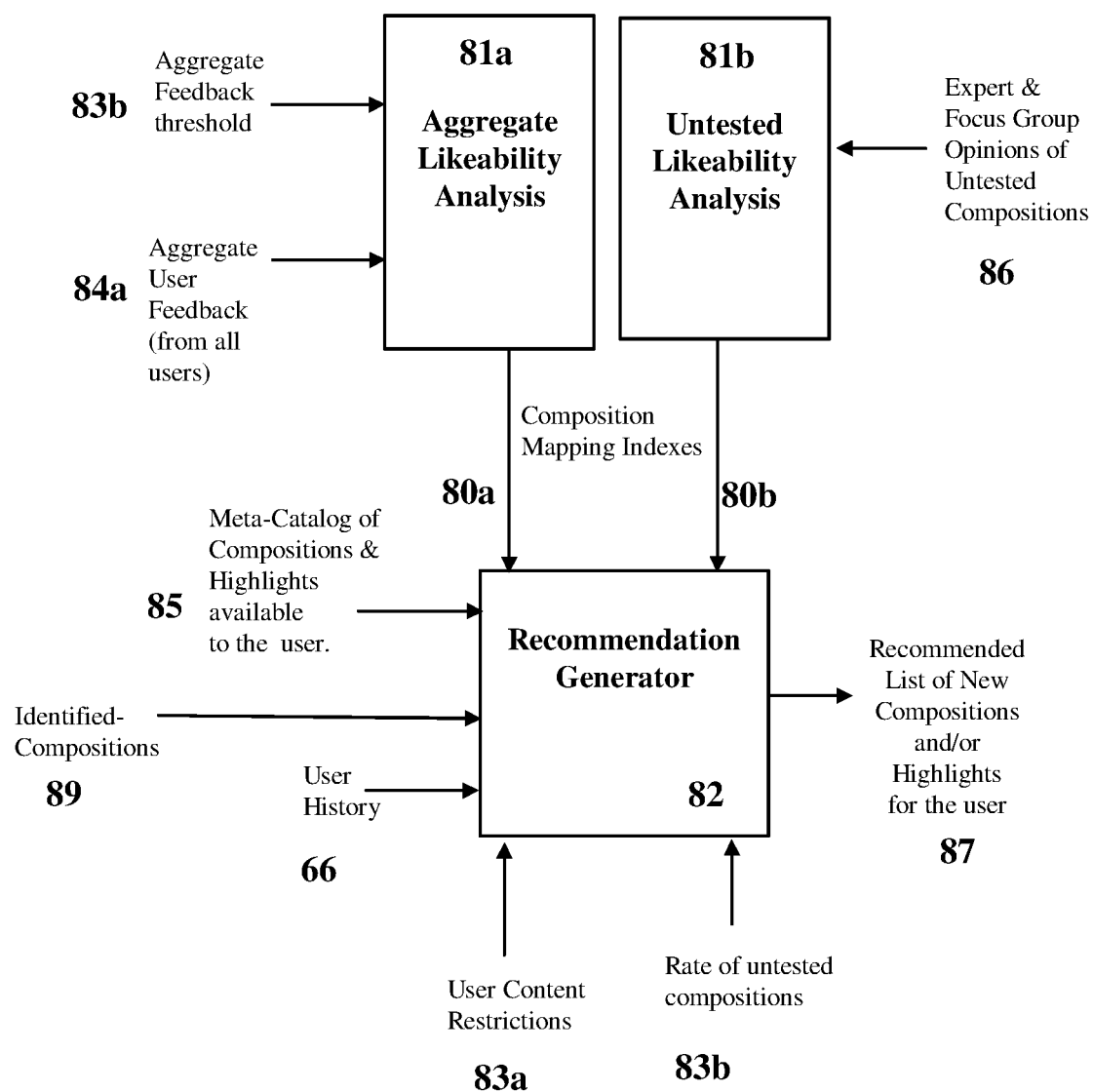
FIG. 8 illustrates a process for recommending new compositions and new highlights for a user.

Selection of New Compositions and Highlights:

A process for generating a "recommended list of new compositions and/or highlights for the user" 87 which is customized for each user is shown in FIG. 8. The recommendation generator 82 for new compositions and highlights may utilize the user's history 66 and common likeability indexes (composition mapping indexes) 80a & 80b, in-order to provide a customized experience for each user. The "recommendation list" 87 for each user may also be dependent on the "Meta-catalog of compositions and highlights available to the user" 85. The meta-catalog available to a given user may not include all the compositions available in the world. The meta-catalog 85 available to a user may be limited due to considerations that may include: the user's subscription plan or user purchase limitations or limitations imposed by a particular experience-provider.

In some embodiments, "identified-compositions" 89 and associated "identify-mode" information [described elsewhere] may also be input to the "recommendation generator" 82. Parts of the analysis to decide whether and how to provide an "identified-composition" to a user [as described elsewhere], may be performed by the "recommendation generator" 82.

A common likeability index may contain a mapping of "if liked composition(s)" then "also liked compositions". An example of simple one-to-one likeability index of compositions (i.e., composition mapping index 80) is shown in FIG. 9. For each "if liked composition #" shown in column 1 a list of "also liked composition #'s" are listed in column 2. For example, if composition 854108 is liked then compositions 883491, 103293, and 527177 will probably also be liked. This mapping may be determined by some combination of experts, focus groups, or by an analysis of the aggregate feedback of all users. If the aggregate feedback of all users is employed, then the index may keep track of additional parameters such as "# Users mapped", "# users liking both" and "% users liking both". The aggregate "likeability" mapping analysis may be based on either "current likeability" or "peak likeability" values for the composition.

An example of a more complex many-to-one likeability index (mapping) of compositions is shown in FIG. 10. For each group of "n" (=3 in FIG. 10) "if liked composition #" shown in columns 1 to 3, a list of "also liked composition #'s" are listed in column 4. For example, if compositions 854108, 883491 and 107389 are liked, then compositions 230845, 632952 and 428503 will probably also be liked. To reduce searching, the indexes may be maintained in numerical order and/or with numerical cross-references.

When a new composition is first released it may be considered to be "untested" since no aggregate user history is available. "Expert and focus group opinions" 86 may be used to perform an initial "untested likeability analysis" 81b. Based on the initial index (mapping) 80b, the new composition may be sampled (possibly as highlights) to a limited number of users in-order to obtain "aggregate user feedback" 84a from enough users to perform a "common likeability index analysis" 81a and create an aggregate composition mapping index 80a. Once the "aggregate likeability analysis" 81a is based upon a sufficient amount of "aggregate user feedback" 84a (i.e., exceeds an "aggregate feedback threshold" 83b), the aggregate index (mapping) 80a may then replace the initial expert generated likeability index 80b. In this way, untested new compositions are not widely distributed to new users until an initial aggregate feedback establishes their likeability with a smaller number of users. In this manner, a greater variety of new compositions may be each initially tested with a small subset of all users without burdening any one user with many untested compositions. Alternatively, "cutting edge" users may be offered the option of subscribing or activating a special "untested" mode and to be exposed to a greater number of untested compositions. A "rate of untested compositions" parameter 83b may be used to control each user's preferred amount of exposure to "untested" compositions and/or highlights.

A list of recommended new highlights and/or compositions for each user may be generated in advance at the experience-provider's network location. The list is ranked and ordered based on compositions that are most likely to be pleasing to the user. Depending on the rankings and quantity of highlights previously downloaded and still unused at the user-device, some or all of the highlights in the revised highlight list may be downloaded into the user-device 22 so they may be immediately available if requested by user action. The full composition may also be down loaded at the same time as the highlight so it is immediately available if the user requests the full composition be played upon hearing the highlight.

Another optional enhancement, is to additionally constrain the recommended new compositions and highlights based on "user content restrictions" 83a. Each composition may be pre-tagged by restriction categories, by the content providers or content rating providers. Restriction categories may be based on factors such as the user's age, language, violence, sex content, etc. The content restrictions may be settable by the user or the user's guardian (through password protection), in-order to prevent the recommendation and playback of highlights/compositions from undesired categories.

User Channels, Moods and/or Categories:

The user-device 22 may optionally allow the user to create a plurality of uniquely defined channels, each for a different user mood, activity, event or category of music. For example, the user may desire a dinner music channel, dance music channel, commuting channel, romantic channel, etc. As with a normal radio, at power-on the user-device 22 may start playing at the last channel the user was at.

In one embodiment, each channel may be defined to be handled by a different experience-provider. For example, the user may select experience-provider1 for their rock music channel while selecting experience-provider2 for both a romantic channel and a classic music channel. The user may be able to instantly switch between experience-providers by simply switching channels via a change channel control.

The user's channels may be accessed via the "My" channels control 43a shown in FIG. 4. In one embodiment, the favorite (most used) user channel starts playing when the "My" channels control is activated (pushed). The remaining user channels may be ordered from most used to least used and may be reached using the channel "up" 43c and "down" 43d controls. The list may be wrapped around so pressing "up" 43c when at "most used" channel may wrap to the "least used" channel. Pressing "down" 43d at the "least used" channel may wrap to the "most used" channel. If the user has only defined one channel, then the "up" and "down" controls wrap on the single channel and hence do not cause a channel change. As shown in FIG. 4, the display 40 may indicate the name of the current user channel playing and how many other user channels are available. The display may include a channel slider 44 to indicate where the channel is relative to the user's favorite channel (based on the user's history of channel activity and feedback). A slider 44 position at the top may be used to indicate the user's most favorite channel. A slider 44 position at the bottom may be used to indicate the user's least favorite channel. The size of the slider relative to the slider range may be used to provide an indication of the size of a channel relative to the total number of user channels. For example, if there are 5 user channels then the size of the slider is displayed as one fifth of the slider range.

The user may begin the creation of a new user channel by activating the "Create" channel control 43*b*. The user now has access to a plurality of "starting" channels (possibly 100's) via the channel "up" 43*c* and "down" 43*d* controls. Each of these channels may be provided by a different experience-provider.

In one embodiment, each "starting" channel may be playing "highlights" representing a different mood or category of music. The ordering of the "highlights" channels may be based on the user's history (and the aggregate experience of similar users), so that the most likely pleasing "highlight" channels for each user, require the fewest pushes of the channel "up" 43*c* and "down" 43*d* controls. The user provides feedback about each channel by the amount of time spent at a channel. The user also provides feedback on each "highlight" while it is playing via the "forward" 42*c*, "back"42*f*, "like" 42*g* and "play" 42*d* controls. All the feedback history is retained for use the next time the "create channel" mode is entered. Once the user has generated a threshold amount of positive feedback on a "highlight" channel, a new user channel may be automatically added to the user's channel list. Until the user has provided a second higher threshold of feedback, the new channel may tend to provide a larger number of highlights in-order to allow the user to more quickly tune the channel to the user's preferences.

As another optional capability, the user would be able to define a playback by artist, album, title, time period, musical category, etc or search a catalog based on such parameters.

Methods for deleting, splitting and merging channels may be incorporated into the user-device.

Different "starting" channels may be created by the same or by different experience-providers but all channels may utilize a single, common collection of user usage-rights tokens.

Acquiring Usage-Rights for a User:

In one embodiment, the usage-rights may be issued by the composition-providers 23 and then stored in the usage-rights repository 24 so the usage-rights may be used by all experience-providers 26.

Figure 14:
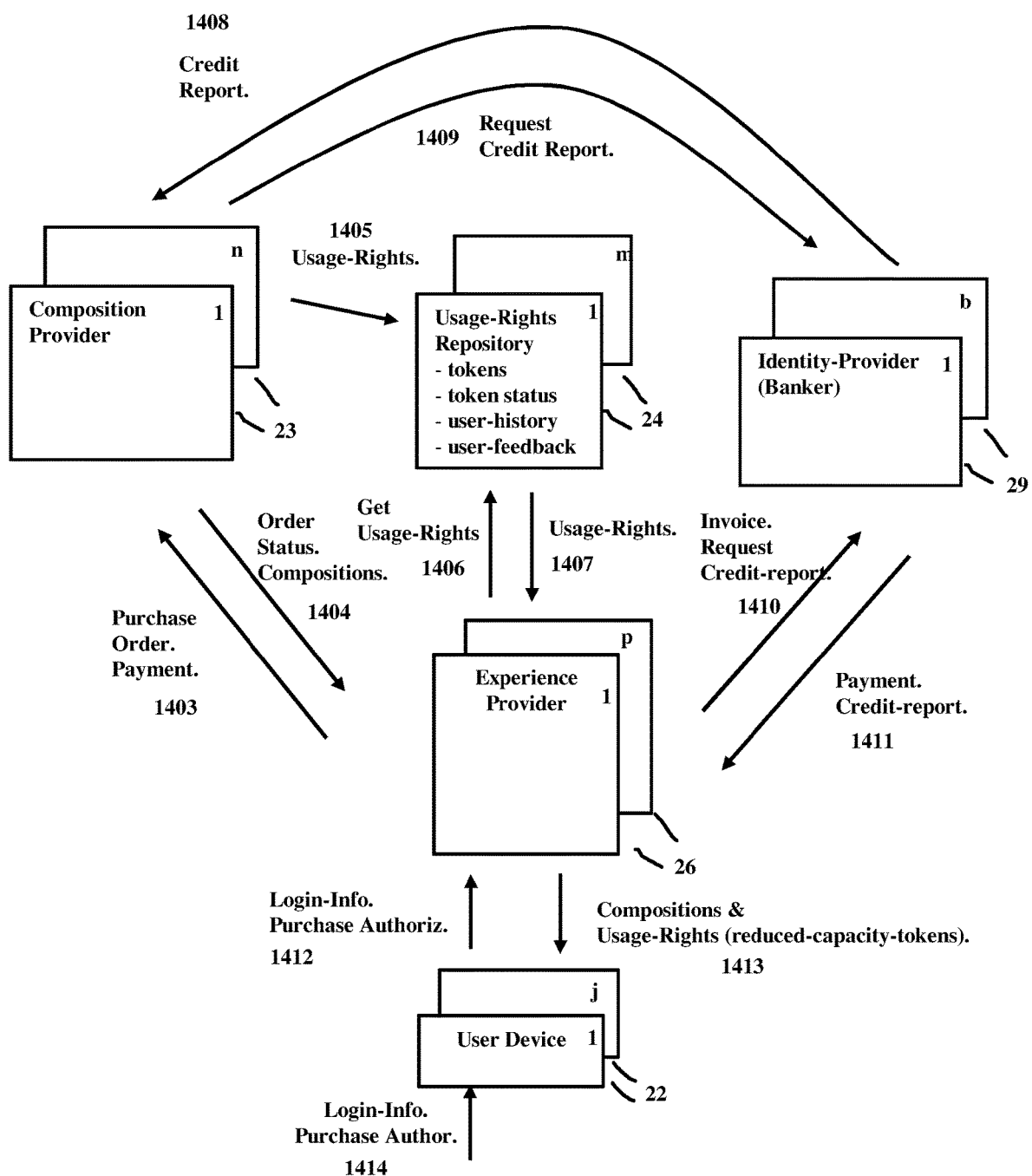
FIG. 14 shows an example of the acquisition of usage-rights for a user.

FIG. 14 shows an example of the acquisition of usage-rights for a user. An experience-provider 26 may handle the acquisition of the usage-rights on the user's behalf. Login-Info at the user-device is used to determine that a specific user is active at the user-device and has authorized the acquisition 1414 of usage-rights for a composition.

In one embodiment, the composition-provider may control the issuance of usage-rights. The acquisition request may be communicated 1412 to the experience-provider and validated. The experience-provider 26 may submit a "pur-chase-order and payment" 1403 to a composition-provider 23. The composition-provider 23 may optionally request a credit-report 1409 from the identity-provider (banker) and receive back 1408 a credit report on the user's account. If acceptable, the composition-provider 23 creates and places 1405 a copy of the user's new usage-rights for the composition in the usage-rights repository 24. The composition-provider 23 may communicate 1404 order status/completion to the experience-provider 26. If the experience-provider does not yet have a copy, the composition-provider 23 may also forward 1404 a copy of the composition to the experience-provider. The experience-provider 26 may now "get" 1406 the new usage-rights from the usage-rights repository 24. The usage-rights repository 24 then forwards 1407 a copy of the new usage-rights to the experience-provider 26. The experience-provider 26 may now package and forward 1413 the composition (in the format needed by the user-device) and the corresponding usage-rights (e.g., a reduced-capacity-token) to the user-device. The new composition is now available for use at the user-device. From time to time, the experience-provider 26 may invoice and request a credit-report 1410 from the identity-provider (e.g., banker) and receive back 1411 payments and credit-reports for the user's account.

The experience-provider 26 may also request free highlights or free samples from a composition-provider 23 on the user's behalf. If the composition-provider 23 determines that the user's credit-report is acceptable, the composition-provider 23 may then issue a token for highlights or samples into the usage-rights database. The tokens for highlights or samples may be for only a limited number of plays, and may be set for each user based on history of the username and/or the credit report.

In another embodiment, the experience-provider 26 may be pre-authorized to issue usage-rights (tokens) based upon a user/user-account meeting a pre-defined set of criteria. The pre-authorization and criteria used may be negotiated and agreed to in advance by both the composition-provider(s) 23 and experience-provider(s) 26. The experience-provider 26 may then be responsible for adding the new usage-right to the usage-rights repository 24 so it may be available to all experience-providers 26. This approach may reduce the time for a new usage-right to be issued and to be available for use at a user-device 22.

In yet another embodiment, the usage-rights repository 24 or another entity may be pre-authorized to issue usage-rights based on a user/user-account meeting a pre-defined set of criteria.

In one preferred embodiment, duplicate purchases of usage-rights (e.g., by different experience-providers) may be detected in the usage-rights repository so duplicate tokens may be revoked and credited back to the user's account. The user is relieved of any concern with accidentally purchasing a composition the user already owns, since any such occurrence is automatically detected and the payment is automatically credited back to the user's account.

Identity-Provider and the Anonymous-ownerID:

To protect user privacy, it is desirable that a user's usage-rights library and play-history not be associated with an actual person. This may be accomplished by the creation of an anonymous-ownerID used to define the ownership of usage-rights (tokens). The experience-providers, usage-rights repository and composition-providers may manage and use the usage-rights and play-history for each anonymous-ownerID without any knowledge of who the actual person is.

An anonymous-ownerID may be created by an identity-provider 29 that is independent from the other providers (e.g., experience-providers, usage-rights repository and composition-providers). In one embodiment, the anonymous-ownerID may include additional information that identifies the identity-provider 29 that manages the anonymous-ownerID account. To maintain user privacy, the identity-providers 29 may not be allowed access to any of the databases of the other providers (experience-providers, usage-rights repository and composition-providers).

Figure 15:
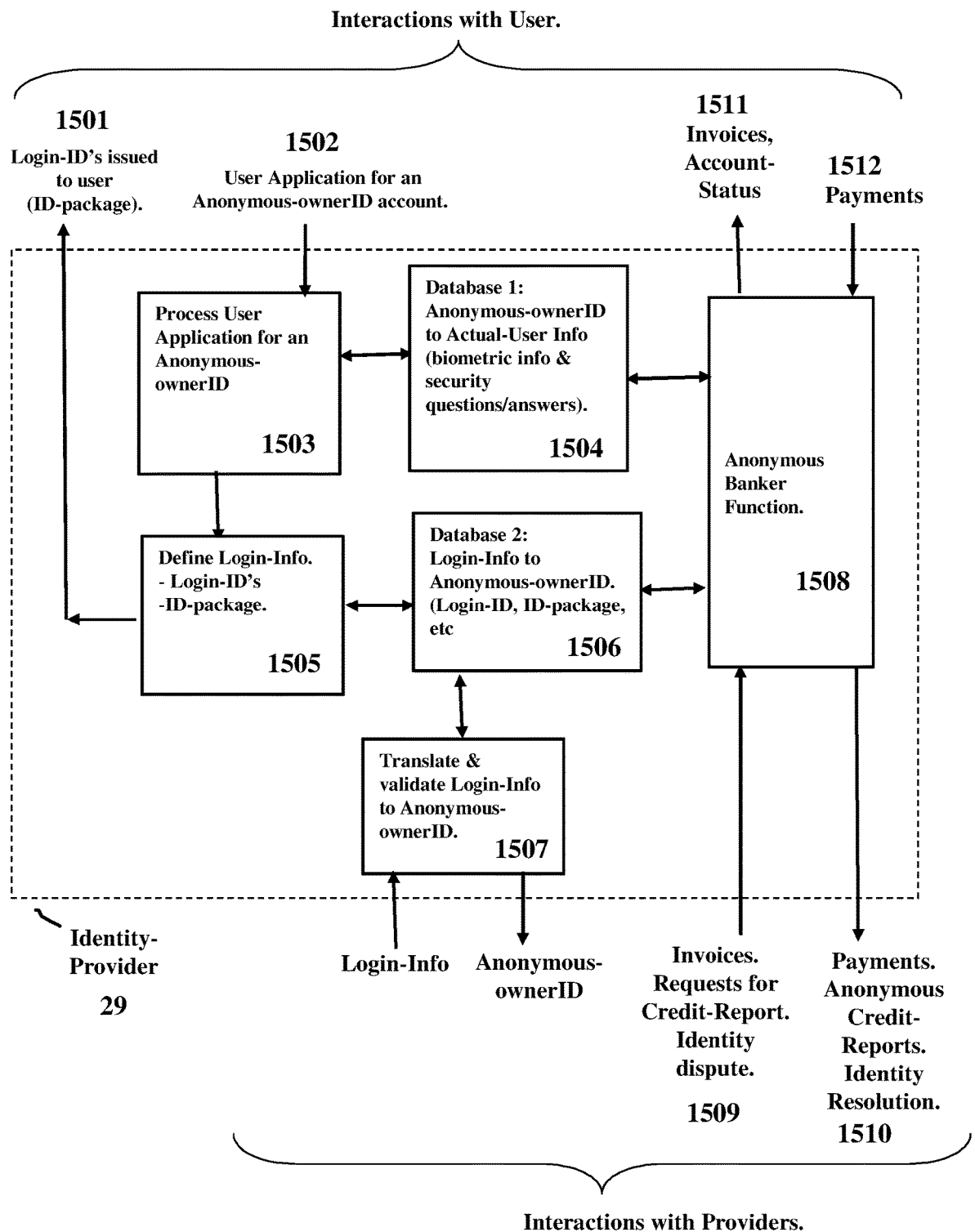
FIG. 15 shows an embodiment of an identity-provider creating an anonymous-ownerID and login-Info; and providing banker functions.

FIG. 15 shows an example of the creation of an anonymous-ownerID and login-Info by an identity-provider. The user submits a "user application for an anonymous-ownerID account" 1502 to an identity-provider 29 that is independent from the providers (e.g., experience-providers, usage-rights repository and composition-providers). In one embodiment, the user may provide information that actually identifies the user such as user name, address, and contact information. The user may also provide biometric identification information. The user may also provide information that is used to unambiguously identify the user in the case of a future identity theft such as one or more secret security questions and answers. The identity-provider 29 may "process the user application for an anonymous-ownerID" 1503. A globally unique anonymous-ownerID is assigned to the user by the identity-provider 29 and stored in a secure database 1504 along with the submitted application information. In a preferred embodiment, the anonymous-ownerID is not provided to the user.

The identity-provider 29 then "defines login-Info" 1505 that the user may use to uniquely identity themselves to user-devices. The login-info may include multiple ways that the user may identify themselves to a user-device. Each user-device 22 may be capable of recognizing some subset of the login-info in-order to uniquely identify the presence of the user at the user-device. This mapping of login-info to anonymous-ownerID may be maintained by the identity-provider 29 in a second secret database 1506.

The "login-ID's (and other login-Info) may be issued to the user" 1501 which define the various ways the user may login at user-devices. Multiple login-ID's may be issued to the user. Which types of biometric methods (finger print scan, face recognition, iris scan, etc) that various user-devices may utilize, may be defined to the user.

The identity-provider 29 may provide to authorized providers (e.g., experience-providers) the "translation of login-info to an anonymous-ownerID" 1507 and the validation of the login-info and the account status for the corresponding anonymous-ownerID.

The identity-provider 29 may also provide an "anonymous banker function" 1508 for the account of the anonymous-ownerID. The providers may submit to the banker "invoices, requests for credit-reports and identity disputes" 1509 related to an anonymous-ownerID and receive back "payments, anonymous credit-reports and identity resolution status" 1510. The banker may use the databases 1504 and 1506 to perform anonymous billing for the account of the anonymous-ownerID. The banker may submit "invoices and status" 1511 to the user and receive payments 1512 from the user.

The identity-provider 29 may also resolve issues related to identity theft or compromises of an owners account by using the other information in the owners application (e.g., security questions or more extensive biometric info).

The compromise of a login-ID or other login-info may be corrected by issuing new login-ID or login-info while revoking the compromised ones. The database 1506 login-info may be remapped to the new anonymous-ownerID.

The compromise of an anonymous-ownerID may be corrected by revoking the compromised anonymous-ownerID and the associated tokens, while issuing a new anonymous-ownerID and the associated replacement tokens. The databases 1504 and 1506 login-info may be remapped to the new anonymous-ownerID.

The compromise of the actual user identity due to public association with an anonymous-ownerID may be recovered by the issuing a new anonymous-ownerID and associated tokens while revoking the older versions, as above.

Usage-Rights Repository:

A secure database of all issued tokens may be maintained in the usage-rights repository. The tokens may be distributed for use at any or all the user-devices and with all experience-providers.

In one preferred embodiment, the user's tokens may be automatically preserved by a usage-rights authority, an experience-provider 26 and/or a storage provider without requiring user efforts. Many copies of a repository may be distributed across multiple computers connected to the network 27 or Internet so that access may be provided by multiple network paths and multiple physically isolated repository locations in case of failures or heavy traffic loads. The repositories may be maintained concurrent by using mirroring or other methods for keeping multiple copies synchronized across a network. In addition, the repositories may also be backed up and/or archived periodically [including to other media] across the network(s) preferably at different physical locations from the repositories.

To eliminate user concerns about the loss of their tokens (representing their collection), a user's complete collection of tokens may be recovered by accessing the usage-rights repository token database. In this manner, a user's collection may be robustly preserved no matter what happens to a user-devices or storage devices.

In one embodiment, the composition-providers or usage-rights repository (i.e., usage-rights authority) may provide a guarantee to users that their usage-rights tokens may be secured in perpetuity (e.g., at least for the life of each usage-rights token and/or the user and/or their heirs). This type guarantee may assure users that all their purchases (acquired usage-rights tokens) may be available automatically from the repository without requiring any user involvement, management or action by the user. When a user purchases the usage-rights (ownership-rights) for a composition, they may be confident that their usage-rights may be automatically usable through all experience-providers and by most (or all) user-devices without requiring any user actions.

To provide additional user confidence in the guarantee, the usage-rights repository (i.e., usage-rights authority) may be industry wide funded and may maintain an endowment large enough to fund the usage-rights repository in perpetuity. The usage-rights authority may charge the composition-providers a small fee (which includes endowment funding) for each entry they make into the database. Since the costs of maintaining a token in the repository are expected to decrease over time due to continuous technology improvements, an endowment funded model may be utilized to support token availability in perpetuity.

A separate repository may be provided by each composition-provider 23 or a common repository(s) may be shared by a group of composition-providers or a common repository may be used by all composition-providers.

The usage-rights repository(s) may be implemented using a database including a relational database. The token-owner and tokenID may be used as common data keys across the relational database. The usage-rights repository may also be implemented as web server; with the experience-providers and composition-providers interacting as clients (in a client-server model). Those experienced in the art will realize that other alternatives may also be used.

Each composition-provider 23 may also maintain a secure version of the usage-rights data that is not accessible by any of the other entities. If the repository accessible data is damaged or corrupted, the repository may be rebuilt using the secured non-accessible version. All the composition-provider databases may be backed up frequently to multiple secure locations distributed at different physical locations across the network 27 or internet.

Only authorized composition-providers may be allowed to write or update the usage-rights repository. In one embodiment, each composition-provider 23 may only add new entries or update the usage-rights entries they have created. A composition-provider 23 may be prevented from accessing the entries of other composition-providers. The usage-rights authority may maintain a private database of authorized composition-providers that are allowed to access the usage-rights repository. Composition-provider 23 access may be controlled by unique private composition-provider-ID and a password.

In one embodiment, all usage-rights tokens in the repository (or repositories) are read accessible by all authorized experience-providers. The usage-rights authority may maintain a private database of authorized experience-providers that are allowed to read the usage-rights database. Experience-provider 26 access may be controlled by unique private experience-provider-ID and a password.

The usage-rights repository may not be accessible to certain providers (e.g., identity-providers) or to the general public over the internet.

In some embodiments, the usage-rights repository(s) may also maintain the status of each token. The token-status indicates whether a token is valid or invalid. A token may become invalid because of a token upgrade, token compromise, identity-theft, identity-compromise, etc.

In-order to provide greater database integrity, the database may be constructed so previously entered records may not be deleted or changed but earlier entries may be updated by the addition of a more current database entry. Database records may include one or more changeable parameter(s) which may point-to or indicate a newer record exists. A log of all database record changes and accesses may also be maintained so problems may be traced back to their source.

To facilitate rapid access to a given token-owner's usage-rights, a lookup table (database) may be used to translate from a token-owner (& perhaps compositionID) to the network 27 addresses of one or more computers (or storage devices) where the specific physical location(s) where the token-owner usage-rights are stored. Such lookup may be redundantly distributed at different physical locations across the network. An implementation similar to that used for the Internet's Domain Name Servers (DNS) may be utilized. Those skilled in the art will recognize that many other alternative implementations are possible.

User Feedback and Play-History:

User play history is a record of the user's interaction/feedback about each composition the user has experience. This record may include usage date/time; experience-provider; % of composition played; how the playback was initiated; and other similar information. The users play history may be used by an experience-provider 26 to automatically create a customized personalized sequence of old and new compositions that may be pleasing to each user.

In some embodiments, the play history may include a usage-history of each token. In other embodiments, the play-history may be an aggregate history for each user where the play-history of upgraded tokens and re-issued tokens for the same composition are combined together.

The user-history may be maintained in a database by either the user, by the usage-rights repository or by the experience-provider(s) or other provider. In one embodiment, user's play-history may be stored in the usage-rights repository with access provided to all experience-providers.

The contents & structure of the play-history may be defined by an industry standard or standards defined by the experience-providers and other providers. Portions of the play-history may be defined using a mark-up language such as the Extensible Markup Language (XML) with a schema definition that defines each element.

FIG. 16 shows an example of the contents of a user's play history for a composition (for a unique user). The play-history may include an anonymous-ownerID 1304; the composition-ID 1603; and a record-of-play 1604 for each time the user experienced the composition. The play-history may also include a parameter that points to the last record 1605. The play-history may also include parameters that summarize the user's experience with the composition such as "number of times played" 1606 and "average % played" 1607. The play-history may also include one or more validation hashes (digital signatures) 1608.

FIG. 17 shows an example of the contents of a "record-of-play "n" 1604. The record-of-play may include the "date & time played" 1702; the "experience-provider coordinating the playback" 1703; the % played 1704; the "usage-rights token-ID used" 1705; likeability indicators 1707; and "how initiated" 1707. The "how initiated" may indicate whether it was automatically chosen without user input or how the user specifically requested the composition to be played (library search or using "back" control or other ways). The record-of-play may also include "reporting status" 1708 to indicate whether the record-of-play has already been reported to the next higher play-history collection point. The record-of-play may also include one or more validation hashes (digital signatures) 1709.

Figure 18:
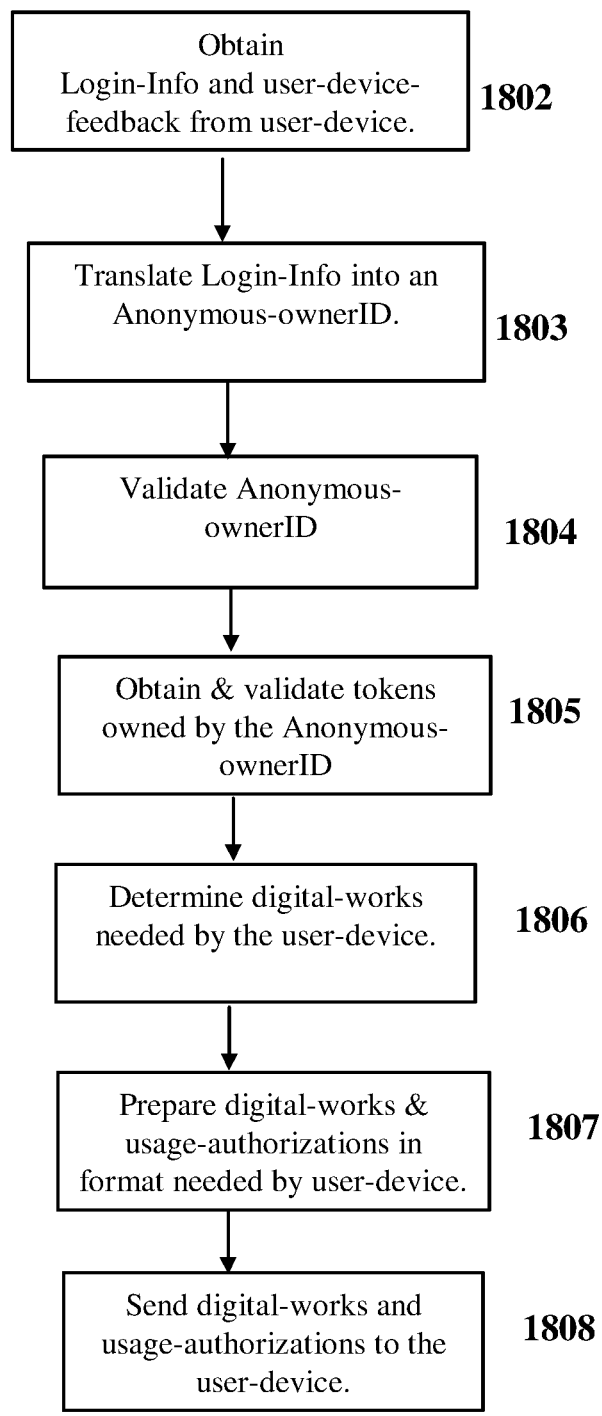
FIG. 18 illustrates an embodiment for distributing digital-works to a user-device.

Distribution of Digital-works to User-Devices:

FIG. 18 illustrates one embodiment for distributing digital-works to a user-device. In some embodiments, a subset of these steps may be used. In some embodiments, the steps may be performed in a different order or with some steps combined together.

The first step in FIG. 18 is to "Obtain Login-Info and user-device-feedback information from the user-device" 1802. When a user is active at a user-device, the user-device 22 may capture Login-Info in-order to identify the specific user. The user-device-feedback represents prior usage-history and user-feedback since the last time the user-device-feedback was successfully transferred. This information may be sent from the user-device 22 across the network 27 to the experience-provider 26.

Since a given user-device 22 may be compatible with a limited number of digital-work formats, the user-device 22 may also forward its device-type to the experience-provider 26 so the experience-provider may determine the particular formats that the user-device requires.

The Login-Info may include entry of the user's Login-Name/password; a spoken user codeword (such as a LoginName/password); user voice recognition; user-biometrics (e.g., face recognition, fingerprint recognition, iris scan recognition); a User Radio Frequency ID (RFID) Tag identification device; a user-ID device or any other method of uniquely identifying a user. In-order to protect against the actual identity of the user, biometric information may be limited to a portion of the full biometric data or a processed summary of the biometric data. Combinations of these identification methods may be used to reduce the false-positive and false-negative identification error rates.

In one preferred embodiment, the user may be uniquely identified from the Login-Info but the actual identity of the user may not be obtained from the Login-Info.

The next step is to "Translate the Login-Info into an Anonymous-ownerID" 1803. In one embodiment, the Anonymous-ownerID may correspond to the token-owner parameter(s) 1304 of the usage-rights token definitions for which that user has rights to utilize.

In one embodiment, the Login-Info to Anonymous-ownerID translation may be performed by an identity-provider 29 which maintains a mapping of Login-Info to Anonymous-ownerID's. Only authorized providers may be allowed to request a Login-Info to Anonymous-ownerID translation.

The Login-Info may also be validated against the experience-provider's database of Login-Info that previously occurred.

The next step is to "Validate the Anonymous-ownerID" 1804. The identity-provider 29 may maintain status on the validity of the Anonymous-ownerID. The status may indicate whether there is compromise of a user's identity (e.g., identity theft) or unusual suspect activity in the user account. The identity-provider 29 may also maintain an anonymous credit report about the Anonymous-ownerID that may be used to assess the trustworthiness and reliability of the user.

The experience-providers may also "validate the Anonymous-ownerID" 1804 by monitoring for indications of piracy, identity theft or stolen user-devices 22. This may include examining the user-history for unusual activities such as a) the simultaneous use of multiple user-devices at different physical locations; b) unusual or excessive non-reporting back of user-history from user-devices; c) errors or corruption of formats and digital signatures; d) an excessively large number of user-devices.

Once the Anonymous-ownerID of the user has been determined and validated, the experience-provider 26 may "obtain and validate all the tokens owned by the anonymous-ownerID" 1805 from the usage-rights repository. The validity of each token may be validated using token-status that may also be maintained in the usage-rights repository. Bogus tokens may be detected and excluded during validation. Token status may also be used to revoke a token that has been compromised or revoked/re-issued.

The next step is to "Determine digital-works needed by the user-device" 1806. These may be digital-works related to the current context of the user-device 22 such as digital-works that the user has requested; or digital-works in the user's library; or digital-works in a user's playlist; or a sequence of digital-works defined specially for the user. In one embodiment, the determination of possibly needed digital-works may be based upon the user's playback-history and/or the user's feedback-history.

The next step is to "Prepare digital-works and usage-authorizations in format needed by the user-device" 1807.

Each user-device 22 may provide information (e.g., model & serial number) that allows the experience-provider 26 to determine the specific formats required by each user-device. A user-device 22 status may also indicate which digital-works and validated usage-rights are already available at the user-device.

In one preferred embodiment, the full usage-rights (usage-rights token) is not transferred to the user-device 22 but is gradually released to the individual user-devices by using a limited usage-authorization (e.g., reduced-capacity-token). A reduced-capacity-token (i.e. authorization to use the digital-work) may have less than the full definition of usage-rights and may typically expire before the full usage-rights expire. The reduced-capacity-tokens may be periodically re-issued or updated when feedback from a user-device 22 confirms that the usage-rights are being properly used. In this manner, the usage-rights are metered to the various user user-devices as long as user-device 22 activity is considered normal.

In one preferred embodiment, a downloaded digital-work may be enabled for playback at a user-device 22 by a reduced-capacity-token that is usable only by a specific user or set of specific users; on the specific user-device 22 and only for a limited authorized-time or limited number of playbacks. The authorized-time may be hours to several days and/or for a limited number of plays. To continue playing the digital-work, the user-device 22 must provide feedback to the experience-provider 26 across the network 27 and receive back an updated reduced-capacity-token from the experience-provider. Otherwise, the reduced-capacity-token may expire before the user's full usage-rights have expired.

The reduced-capacity-token may allow the digital-work to be played on the user-device for only a limited time period (for example, for only an hour or a day or a few weeks). The user-device 22 may periodically interact with the experience-provider 26 across the network 27 to feedback user-history and to receive an extension of the time period. If the user-device 22 does not connect back to the experience-provider, the digital-works may expire after the usage-authorization time period. The time period may be set for each user based on estimated user trustworthiness factors such as the user's anonymous credit report and/or the historical experience with a user. For example, the time period may be set long for a reliable customer with an extensive positive history. If a user-device 22 is prevented from reporting back the user-history or is lost or stolen, the digital-works in the user-device may expire after the time period but the full usage-rights held in the usage-rights repository are not compromised or affected.

In one preferred embodiment, a user-device 22 is not authorized to create copies that can be transferred to other user-devices. Since the user's collection is automatically backed-up via the network repository and since each user-device 22 is able to acquire any needed digital-works automatically across the network, there is no longer a need for users to make copies themselves so reduced-capacity-tokens may typically be defined to not allow copies to be created at user-devices.

A special case occurs with user-devices that do not have a real-time network connection capability or may never be within reach of a real-time network connection. For this case, a portable user-device 22 may be used to act as a "transportation delayed" network connection. The reduced-capacity-tokens in the portable user-device may be immediately disabled upon their transfer to an un-networked user-device. When the user finishes with the un-networked user-device, the user-history and usage-rights may then be transferred from the un-networked user-device back to the portable user-device. When the portable user-device reestablishes a real-time network connection, the user-history (including that of the un-networked user-device) is feedback to the usage-rights repository. To handle this special case, digital-works and their corresponding reduced-capacity-tokens may be allowed to be transferred between user-devices as long as no copying occurs (i.e., user-devices are not allowed to create additional copies).

The next step is to "Send the digital-works and usage-authorization (e.g., reduced-capacity-token) to the user-device" 1808. In one preferred embodiment, digital-works and their corresponding usage-authorization (e.g., reduced-capacity-tokens) may be automatically distributed across the network 27 by the experience-provider 26 in the appropriate format for the user-device as needed or in anticipation of being needed.

Once a compatible version of the digital-work and the corresponding usage-authorization (e.g., reduced-capacity-token) are at the user-device, the user-device 22 may use an unexpired usage-authorization to access (e.g., decrypt) and use the digital-work whenever the user is active at the user-device.

Network Strategies:

It is expected that each user may have multiple user-devices that need to be updated such that any changes to the user's history and user's collection (i.e., the user's library of compositions) is automatically made available, in a timely manner, to all the other user-devices where the user is active. For example, any changes made in the automobile on the way home may be immediately available, in the ideal, to user-devices in the user's home.

In one embodiment, each user-device 22 would be capable of establishing two way communication in-order to interact with the experience-provider 26 over a wireless or wired connection to a network such as the internet.

When the user-device 22 has sufficient storage, the user's favorites may be stored locally and the general network strategy is to download the most likely needed compositions and highlights well in advance of actual need by the user-device. Having storage in each user-device 22 is more accommodating to poor quality, intermittent, or missing network connections.

When a local user-device 22 has sufficient local storage, the network interface may be managed to minimize communication costs. For example, the largest downloads and uploads may be scheduled during those times (of the day or night or week) when the communication costs are lower. For example, downloads of new compositions and highlights may occur, automatically without user action, in the middle of the night and then stored within each user-device 22 for possible use during the following days. More information may be downloaded than is typically expected to be needed, just so it may be available if needed. Since the typical user's tastes change slowly over a period of days, the locally stored compositions and highlights may be fairly up-to-date; but an automatically generated sequence of compositions may be less then ideal when switching between user-devices (e.g., car to house), since the most recent user history would not be exchanged until later that night. If desired, the less data intensive user history/feedback may be communicated more frequently, while the more data intensive downloads may be restricted to lower cost communication times.

Another alternative, the data intensive information (compositions and highlights) may be broadcast and/or multicast to multiple users simultaneously over the network. Prior to the broadcast or multicast, each user-device 22 may receive an update on what new compositions and highlights that user needs. The user-devices then monitor the broadcast or multicast, and save the appropriate data the user is expected to need.

The invention may also be embodied via streaming over a network connection such as the Internet. With streaming, the personalized sequence is generated at the experience-provider's location on the network 27 (e.g., internet server) and forwarded, wired and/or wirelessly, to the user-device as a stream of packets. The user-device is simplified since it only need convert the packets into the entertainment sequence (e.g., sound sequence) and send the user's feedback back across the network 27 to the experience-provider. Streaming reduces the needed amount of local storage and local processing in the user-device. Usually a small local memory (such as a FIFO or double buffer) is used in the local user-device to provide a continuous sound stream on the output side, despite fluctuations in the receipt and processing of packets across the network connection. A disadvantage of streaming is that a virtually continuous interactive network connection at an effective bandwidth must be available. Another major disadvantage is that the network connection must have an acceptably low interactive latency so the experience-provider's streaming source may quickly adjust to the user's feedback and control inputs (such as the "Forward" and "Back" controls). The need for a higher quality network connection to be continuously available may make streaming a less desirable alternative.

Implementation of the Network:

For security and performance reasons, the network 27 between the providers may be separated from the network 27 between the user-devices 22 and the experience-providers 26.

The physical network layer may be a combination of optical fiber, wired and wireless (EM, RF, IR, optical) networks. The network 27 architecture may be configured using elements such as add-drop multiplexers (electrical and optical), routers, switches, gateways, bridges, and firewalls. Network availability may be improved by providing redundant network paths, redundant servers (at different physical locations) and robust network architectures such as mesh networks. Existing Internet infrastructures may be used but security, privacy and quality of service issues should be considered.

Quality-of-Service (QoS) parameters such as latency may be improved by the use of Multi-Protocol Label Switching (MPLS) or Generalized Multi-Protocol Label Switching (GMPLS) which may route messages through pre-defined un-congested network paths thereby reducing queuing delays, timeouts and re-transmissions. Forward error correction may allow correction of transmission errors at the receiver and reduce delays from re-transmissions.

Those skilled in the art will realize there are many models of distributed processing and information transfer protocols that may be used in a hierarchical manner in the network. The protocols may be configured or layered in terms of the 7 layer ISO/OSI network model or other protocol layer models (e.g., Internet or Darpa) to meet requirements for security and quality of service (QoS) such as latency, lost packets or messages, error detection, control, message/packet retransmission, etc. Examples of protocols include Sonet, Frame, Asynchronous Transfer Mode (ATM), Internet Protocol (IP), Transfer Control Protocol (TCP), User Datagram Protocol (UDP), Ethernet, File Transfer Protocol (FTP), and Hyper Text Transfer Protocol (HTTP).

In some embodiments, a client-server model may be used for interactions between the providers. For example, a first provider acting as a client, may construct a request as an extensible markup language (XML) message and send it across the network 27 using hypertext transfer protocol (HTTP) to a server at a second provider. The server at the second provider may then process the XML message and then send an XML formatted message back across the network 27 using HTTP to the client application at the first provider. Those skilled in the art will realize there are many alternative approaches such as the common object request broker architecture (CORBA); the simple object access protocol (SOAP); Semantic Web (e.g., w3.org) technologies and others. Peer-to-peer embodiments may also be used.

Various combinations of public-key (e.g., public/private key pairs such as the RSA algorithm) and private key (e.g., symmetric key) encryption may be used to provide security/privacy and prevent piracy. Examples of secure transfer protocols include Hyper Text Transfer Protocol Secure (HTTPS), Secure-HTTP (S-HTTP), and Secure Sockets Layer (SSL). The Diffie-Hellman Key Agreement Method (IETF RFC 2631) or other known methods (e.g., telephone call-back exchange protocols) may be used for key distribution/exchange.

Digital signatures (e.g., combinations of one-way-hash-functions and public-private-keys) may be used to protect against any addition, removal or alteration of the information after it was created, for example during later transit or storage. Examples of hash-functions include MD5 (128 bit) and SHA-1 (160 bit).

Certificate authorities may be used to control the issuance and validation of digital certificates so that a sender may validate that the public-keys are truly those of the intended recipient before encrypting & signing a message. For an additional layer of protection, access to these public keys and certificates may be limited to authorized entities.

Firewalls and virtual private networks (VPN's) may also be used to provide an additional level of privacy between the sender and receiver. Communication may be restricted to only authorized IP addresses. Only authorized provider entities with a known entityID (and password) may be allowed to send information transfers. Each authorized entity may be restricted to certain types of information transfers or transactions.

An even higher level of security and service between the providers may be provided with a dedicated network 27 that is completely separate from the Internet. A separate network using separate dense wavelength division multiplexing (DWDM) optical-channels and isolated routers may provide isolation from Internet problems such as excessive traffic or denial of service attacks. For example, Broadwing Communications offers a Converged Services Network infrastructure based on Multiprotocol Label Switching (MPLS) that provides both Layer 2 and Layer 3 Virtual Private Network (VPN) that is separate from the Internet.

In one embodiment, a public network with a wide geographic availability (such as the Internet) may be used for communications between user-devices and the experience-providers 26 so all user-devices may be able to automatically connect to the network 27, no matter where a user-device 22 is currently at. In one embodiment, each user-device 22 may intermittently communicate across the network with the experience-provider 26 to perform functions such as; feeding back user-history; obtaining compositions/highlights; obtaining/extending/updating usage-rights; and validating the user-device. Depending on the embodiment, network access may range from being essentially continuous to only occurring periodically once every few weeks.

Business Models:

This invention is capable of simultaneously supporting many different schemes for generating revenue and/or royalties for the experience-providers, network providers, composition-providers, composition creators and artistic performers. The schemes include:

(1) Fee for each composition each time it is played.
(2) One time fee for unlimited play of a composition by the user.
(3) A fee per minute or hour of experience provided to the user.
(4) A flat fee per month for unlimited user usage.
(5) A flat fee per month for unlimited user usage plus the addition of "v" compositions (permanent ownership or usage-rights) per month to the user's library.
(6) Advertisement supported, where the user may listen to and possibly interact to a certain amount of ad time per a pre-defined amount of non-ad user time.
(7) A certain number of free plays followed by some fee for play.
(8) Fee based on the number of user-devices.
(9) Fee based on the number of user-devices simultaneously active.
(10) Fee based on the amount of data transferred across the network.
(11) Various combinations of the above.

The billing scheme may be customized for each user. The history of the aggregate usage for each composition may also be used to determine royalties for the composition creators, composition owners and other service providers.

The composition-providers may offer various purchase plans. The experience-provider 26 may mediate to acquire the best price for the user based on expected user needs. In some embodiments, the composition-providers may price usage-rights so that the cost of gradually expanding the usage-rights, is the same as if the full-rights were purchased initially. By always guaranteeing the best price and eliminating user concerns about pricing, sales may be increased.

As an optional enhancement, the user may be allowed to use the "forward" control to skip any offensive or unwanted advertisement (ad). Alternative ads may then be presented to the user until the required user ad time is satisfied. When the user wants additional information about the product in an ad, the user activates (presses) the "like" control. Additional information is then presented. The user may also activate the "back" control to hear an ad again in-order to repeat needed information such as a phone number or address. The user's account is credited for the additional ad time heard. The user's use of the "forward" and "back" controls during ads may be used to more closely target future ads to the user.

Initial System Customization to the User:

To more efficiently perform customization of the system for each user, a large display with an interactive user interface may be utilized across a network 27 during the initial user customization process. The user may answer forms on the user's interests, hobbies, categories or products of interest, etc.

This may include the establishment of methods for confirming the user's identity at the start of future user-device sessions. This may include capturing sound to be used for voice recognition of the user's name or other specific words, biometrics measurements of the user such as fingerprint on the start control, or camera imaging of the user's face.

The user may also indicate initial preferences for advertisement categories. In this mode, the user may be presented with different product categories and product types for which the user may use the "Like" control to indicate relative interest in.

The user may also wish to customize of the type and frequency of news, weather, traffic, etc based on the day of week, time of day, location of user, etc.

The initial preferences the user provides are only the starting point. User feedback, indicated by normal user control actions, is utilized to continuously adopt the entertainment sequence more uniquely for each individual user.

Additional Applications & Embodiments of the Invention:

In order to more clearly illustrate functionality, portions of the preceding discussion were oriented toward a user-device 22 with a manually controlled interface; however the invention may utilize any type of user interface including voice controlled.

In order to more clearly illustrate functionality, portions of the foregoing discussion were described in terms of music and/or music videos, however this invention is more generally useful for the generation of any type of personalized entertainment experience that is customized for each user. The entertainment experience that is personalized for each user may be comprised of a sequence of any type of entertainment compositions including music, music videos, short films, movies, video programs, audio versions of books, talks, speeches, voice content, lectures, etc.

Although some of the detailed embodiments may be illustrated or described in terms of audio or musical compositions, the invention is more generally applied to any type of composition, digital-work or digital-content including recorded-music; music videos; multi-media; artwork; pictures; audio; sound; short films; movies; video clips; television programs; audio versions of books; talks; speeches; voice content; lectures; software; software plug-ins; and any other type of digital-work.

In general, where the word "composition" is used in the description, "digital-work" or "digital-content" may be substituted in its place. Where the words "playback-device" or "player" or "media-player" is used in the description, "user-device" may be substituted in its place. Where the word "composition-provider" is used in the description, "digital-work-provider" or "digital-content-provider" may be substituted in its place.

Not Limited to Detailed Illustrations:

To satisfy the requirements for enablement, this disclosure may contain one or more embodiments which illustrate a particular detailed implementation and use. A detailed illustration often requires choosing only one of a plurality of equivalent detail approaches to show. When terms such as "shall", "should", "is", "are" appear, they should only be interpreted as limitations/requirements for the purpose of maintaining compatibility/consistency between the elements/parameters of the particular detailed illustration. Such terms should not be interpreted as limitations or requirements on the scope of the general inventive concept as disclosed in its entirety.

For example, if element "A", in a detailed embodiment, is shown as having a certain detailed configuration, then mating element "B" in that detailed example may need to have corresponding limitations in-order to be compatible/interoperable with the detailed element "A". Such limitations on element "B" for compatibility within a detailed illustration do not define limitations on element "B" within all the possible embodiments that fall within the scope of the invention. If another embodiment had been chosen for illustration purposes, element "A" may have a very different detailed configuration and the requirements on element "B" for compatible/interoperable with the element "A" may be very different.

In general, the detailed implementations for the elements of the invention may have many alternate implementations that accomplish the same functional result/objective and are within the scope of the general inventive concept.

What is claimed is:

1. An apparatus-implemented method comprising:
capturing, with image-sensor(s) and/or video-sensor(s) associated with a user-device, image(s) of a least parts of an external-composition containing image(s) that is occurring external to said user-device;
obtaining, by electronic-circuitry and/or processor(s), an identification of said composition that was determined by an analysis of said captured image(s) of said external-composition; wherein said identification of said external-composition is initiated when detection circuitry detected action(s) by a user that indicates a user's interest in said external-composition;
selecting, by electronic-circuitry and/or processor(s), a marketed-composition that: is at least a portion of said identified external-composition or is at least a portion of another composition that was determined to be related to said identified external-composition; wherein said user is determined to have no or only partial usage-rights, for said marketed-composition;
obtaining, by electronic-circuitry and/or processor(s), usage-rights, to allow said marketed-composition to be played-back, a limited amount or limited number of times, in a sequence of compositions that is customized for said user;
playing, by electronic-circuitry and/or processor(s), at a time that is unrelated to said detection of said action(s) by said user: a sequence of compositions that is customized for said user;
wherein following compositions in said sequence automatically begin play without requiring action by said user; and wherein a playback of said marketed-composition is automatically initiated as part of said sequence of compositions, and
wherein, when more than one composition is identified as probably said external-composition: then a plurality of different said probably identified-composition are interspersed in said sequence of compositions.

2. The method as in claim 1: wherein said external-composition is a music video, a movie, a video, a television, an active display, a fixed display, a sign, an advertisement, or printed material, that is external to said user-device.

3. The method as in claim 1 wherein said playback of said marketed-composition as part of said sequence of compositions, is initiated at a time that is independent in time from when said detection-circuitry detects said explicit action(s) by a user; whereby said user is not burdened with results from said identification soon after said identification has occurred.

4. The method as in claim 1 wherein said marketed-composition comprises a complete version of a composition that was determined to be related to said identified external-composition.

5. The method as in claim 1 wherein said marketed-composition comprises a highlight of a composition that was determined to be related to said identified external-composition.

6. The method as in claim 1 wherein said marketed-composition is an advertisement for a product or service that is related to said identified external-composition.

7. The method as in claim 1 wherein a plurality of compositions in said sequence are whole compositions for which usage-rights are already owned by said user before said detection-circuitry, detected said explicit action(s) by said user.

8. The method as in claim 1 wherein said image-sensor(s) and/or video-sensor(s) capture part(s) of said external-composition at a first user-device; and wherein said sequence of compositions is played at a second user-device.

9. The method as in claim 1 further comprising, when an authorizing action by said user is detected while said marketed-composition is playing or active in said sequence: initiating an acquisition of enhanced usage-rights for said marketed-composition for said user.

10. The method as in claim 1 further comprising, when an authorizing action by said user is detected while said marketed-composition is playing or active in said sequence: initiating the acquisition of enhanced usage-rights for said marketed-composition for said user; and initiating payment for said enhanced usage-rights on behalf of said user.

11. The method as in claim 1 further comprising,
when an authorizing action by said user is detected while said marketed-composition is playing or active in said sequence:
initiating the acquisition of enhanced usage-rights for said marketed-composition for said user;
initiating payment for said enhanced usage-rights on behalf of said user; and
transmitting a digital representation of at least a subset of said enhanced usage-rights for said marketed-composition across a network, for use at one or more user-devices.

12. The method as in claim 1 wherein said sequence includes information about purchase terms or pricing for said marketed-composition, as part of said sequence of compositions; wherein said information occurs before, during and/or after a playback of said marketed-composition in said sequence.

13. The method as in claim 1 wherein said external-composition is identified by using text recognition of said captured part(s) of said external-composition.

14. The method as in claim 1 wherein said marketed-composition, is interspersed a plurality number of times into said sequence or sequences; wherein said number of times is based a credit report associated with said user.

15. The method as in claim 1 further comprising obtaining limited usage-rights to play said marketed-composition, a limited amount or limited number of times, in a sequence of compositions that is customized for said user; wherein said number of times is based a credit report associated with said user.

16. The method as in claim 1 further comprising obtaining limited usage-rights to play said marketed-composition, a limited amount or limited number of times, in a sequence of compositions that is customized for said user; wherein said number of times is at least partially based on a purchase history of other marketed-compositions that were previously played for said user; wherein said limited usage-rights are obtained for free or without additional cost to said user.

17. The method as in claim 1 further comprising obtaining limited usage-rights to play said marketed-composition, a limited amount or limited number of times, in a sequence of compositions that is customized for said user; wherein said number of times is based a credit report associated with said user; wherein said limited usage-rights are obtained for free or without additional cost to said user.

18. The method as in claim 1 wherein data from said image-sensor(s) and/or video-sensor(s) is captured in a digital memory(s), before said detection-circuitry detected said explicit action(s) by said user; wherein said digital memory comprises a rolling-buffer memory and/or a life-time-history memory.

19. Apparatus for providing compositions to a user, said apparatus comprising:
image-sensor(s) and/or video-sensor(s) associated with a user-device, that capture image(s) of at least parts of an external-composition that is occurring external to said user-device;
detection circuitry that detect action(s) by a user that indicate a user's interest in said external-composition; wherein when user interest is detected, a process is initiated to obtain an identification of said external-composition using said captured image(s) of said external-composition;
electronic-circuitry and/or processor(s) that:
obtain an identification of said external-composition by using said captured image(s) of a least parts of said external-composition;
select a marketed-composition that: is at least a portion of said identified external-composition or is at least a portion of another composition that was determined to be related to said identified external-composition; wherein said user is determined to have no or only partial usage-rights, for said marketed-composition;
obtain usage-rights to allow said marketed-composition to be played-back, a limited amount or limited number of times, in a sequence of compositions that is customized for said user;
play, at a time that is unrelated to said detection of said action(s) by said user: a sequence of compositions that is customized for said user; wherein following compositions in said sequence automatically begin play without requiring action by said user; and wherein a playback of said marketed-composition is automatically initiated as part of said sequence of compositions; and
wherein, when more than one composition is identified as probably said external-composition: then a plurality of different said probably identified-composition are interspersed in said sequence of compositions.

20. One or more, non-transitory storage memory or storage media; having computer-readable instructions thereon which, when executed by one or more processors, implements a method of:
capturing, with image-sensor(s) and/or video-sensor(s) associated with a user-device, image(s) of a least parts of an external-composition containing image(s) that is occurring external to said user-device;
obtaining, by electronic-circuitry and/or processor(s), an identification of said composition that was determined by an analysis of said captured image(s) of said external-composition; wherein said identification of said external-composition is initiated when detection circuitry detected action(s) by a user that indicates a user's interest in said external-composition;
selecting, by electronic-circuitry and/or processor(s), a marketed-composition that: is at least a portion of said identified external-composition or is at least a portion of another composition that was determined to be related to said identified external-composition; wherein said user is determined to have no or only partial usage-rights, for said marketed-composition;
obtaining, by electronic-circuitry and/or processor(s), usage-rights, to allow said marketed-composition to be played-back, a limited amount or limited number of times, in a sequence of compositions that is customized for said user;

playing, by electronic-circuitry and/or processor(s), at a time that is unrelated to said detection of said action(s) by said user: a sequence of compositions that is customized for said user; wherein following compositions in said sequence automatically begin play without requiring action by said user; and wherein a playback of said marketed-composition is automatically initiated as part of said sequence of compositions; and wherein, when more than one composition is identified as probably said external-composition: then a plurality of different said probably identified-compositions are interspersed in said sequence of compositions.

\* \* \* \* \*